US012669861B2

(12) United States Patent
Kondo et al.

(10) Patent No.: US 12,669,861 B2
(45) Date of Patent: Jun. 30, 2026

(54) INFORMATION PROCESSING DEVICE, INFORMATION PROCESSING METHOD, AND DISPLAY DEVICE

(71) Applicant: Sony Group Corporation, Tokyo (JP)

(72) Inventors: Masao Kondo, Tokyo (JP); Junichi Shimizu, Tokyo (JP); Miyu Iwafune, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/835,363

(22) PCT Filed: Feb. 3, 2023

(86) PCT No.: PCT/JP2023/003529
§ 371 (c)(1),
(2) Date: Aug. 2, 2024

(87) PCT Pub. No.: WO2023/157669
PCT Pub. Date: Aug. 24, 2023

(65) Prior Publication Data
US 2025/0147575 A1     May 8, 2025

(30) Foreign Application Priority Data

Feb. 15, 2022     (JP) ................................ 2022-021246

(51) Int. Cl.
| | |
|---|---|
| *G06F 3/01* | (2006.01) |
| *G06F 1/16* | (2006.01) |
| *G06F 3/16* | (2006.01) |

(52) U.S. Cl.
CPC .............. *G06F 3/011* (2013.01); *G06F 1/163* (2013.01); *G06F 3/165* (2013.01); *G06F 2200/1614* (2013.01)

(58) Field of Classification Search
CPC .......... G06F 3/011; G06F 1/163; G06F 3/165; G06F 2200/1614; A44C 5/18; A44B 11/00
See application file for complete search history.

(56) References Cited

U.S. PATENT DOCUMENTS

2014/0028546 A1* 1/2014 Jeon ..................... G06F 3/04842
345/156
2017/0208466 A1 7/2017 Seo
(Continued)

FOREIGN PATENT DOCUMENTS

| | | |
|---|---|---|
| JP | 2017-068446 A | 4/2017 |
| JP | 2018-190455 A | 11/2018 |

OTHER PUBLICATIONS

International Search Report and Written Opinion mailed on Mar. 20, 2023, received for PCT Application PCT/JP2023/003529, filed on Feb. 3, 2023, 09 pages including English Translation.

*Primary Examiner* — Matthew A Eason
*Assistant Examiner* — Chayce R Bibbee
(74) *Attorney, Agent, or Firm* — XSENSUS, LLP

(57) ABSTRACT

An information processing device according to the present disclosure includes: an acquisition unit that acquires first information indicating a state of fingers of a user and second information indicating rotation of a wrist of the user; and a determination unit that determines an output mode of content output from a device on a basis of the state of the fingers of the user indicated by the first information and rotation of the wrist of the user indicated by the second information.

15 Claims, 17 Drawing Sheets

(56) References Cited

U.S. PATENT DOCUMENTS

| | | | |
|---|---|---|---|
| 2019/0018506 A1* | 1/2019 | Bernstein | ............... G04C 3/002 |
| 2020/0150772 A1 | 5/2020 | Quinn | |
| 2021/0124417 A1 | 4/2021 | Ma | |
| 2021/0290791 A1* | 9/2021 | Mandaric | .................. A61L 2/28 |
| 2021/0349552 A1 | 11/2021 | Bernstein | |

\* cited by examiner

START

ACQUIRE FIRST INFORMATION INDICATING STATE OF FINGERS OF USER ⌐ S101

ACQUIRE SECOND INFORMATION INDICATING ROTATION OF WRIST OF USER ⌐ S102

DETERMINE OUTPUT MODE OF CONTENT TO BE OUTPUT FROM DEVICE ON BASIS OF STATE OF FINGERS OF USER INDICATED BY FIRST INFORMATION AND ROTATION OF WRIST OF USER INDICATED BY SECOND INFORMATION ⌐ S103

END

VOLUME LOW  ⟷  VOLUME HIGH

FIG.22

INFORMATION PROCESSING DEVICE, INFORMATION PROCESSING METHOD, AND DISPLAY DEVICE

CROSS-REFERENCE TO RELATED APPLICATIONS

The present disclosure is based on PCT filing PCT/JP2023/003529, filed Feb. 3, 2023, which claims priority from Japanese Patent Application No. 2022-021246, filed Feb. 15, 2022, the contents of each are incorporated herein by reference.

FIELD

The present disclosure relates to an information processing device, an information processing method, and a display device.

BACKGROUND

In recent years, with the development of sensing technology, methods for performing input or control on devices have been diversified. For example, there is known technology of recognizing a motion of user's fingers or the like and accepting the motion of the user's fingers or the like as an operation (for example, Patent Literature 1).

CITATION LIST

Patent Literature

Patent Literature 1: JP 2017-068446 A

SUMMARY

Technical Problem

However, extracted in the related art is a frequency having a predetermined characteristic amount that is a characteristic waveform which is different from a normal waveform or the like of a frequency obtained when an arm or a hand is simply moved casually. Therefore, since the motions of a plurality of parts such as an arm or a hand are treated as frequencies, it is difficult for a user to recognize which part's motion leads to which operation. Furthermore, for example, in a case where the user wears a display device between the user's arm and fingertip, such as a wristband-type display device, there is also a problem that the position of the display to be displayed changes depending on a motion of the part such as the arm or the hand. As described above, in the prior art, there is room for improvement in terms of usability. Therefore, it is desired to enable appropriate provision of information output service depending on the motion of the user.

Therefore, the present disclosure proposes an information processing device, an information processing method, and a display device capable of appropriately providing information output service depending on a motion of a user.

Solution to Problem

According to the present disclosure, an information processing device includes an acquisition unit that acquires first information indicating a state of fingers of a user and second information indicating rotation of a wrist of the user; and a determination unit that determines an output mode of content output from a device on a basis of the state of the fingers of the user indicated by the first information and rotation of the wrist of the user indicated by the second information.

BRIEF DESCRIPTION OF DRAWINGS

FIG. 22 is a diagram illustrating an example of information processing in the ring-type application example.

DESCRIPTION OF EMBODIMENTS

Hereinafter, embodiments of the present disclosure will be described in detail on the basis of the drawings. Note that the information processing device, the information processing method, and the display device according to the present application are not limited by the embodiments. Note that in each of the following embodiments, the same parts are denoted by the same symbols, and redundant description will be omitted.

The present disclosure will be described in the following order of items.

1. Embodiments
1-1. Overview of Configuration and Processing of Information Processing Device According to Embodiment of Present Disclosure
1-1-1. Background and Effects
1-2. Configuration of Information Processing Device According to Embodiment
1-3. Procedure of Information Processing According to Embodiment
1-4. Specific Example
1-4-1. Exemplary Structure for Holding Position of Display Unit
1-4-2. Example of State of Fingers
1-4-2-1. Example of First State
1-4-2-2. Example of Second State
1-4-3. Example of Rotation of Wrist and Operation Target
1-4-4. Detailed Example of Procedure of Information Processing
1-4-5. Another Example of Information Processing
1-4-6. Another Operation Example
2. Other Embodiments
2-1. Other Examples of Device Structure
2-1-1. First Structure Example
2-1-2. Second Structure Example
2-1-3. Third Structure Example
2-1-4. Fourth Structure Example
2-2. Other Application Examples
2-2-1. Ring Type
2-2-2. Handle Grip Type
2-2-3. Pen Type
2-3. Others
3. Effects of Present Disclosure
4. Hardware Configuration

1. EMBODIMENTS

Figure 1:
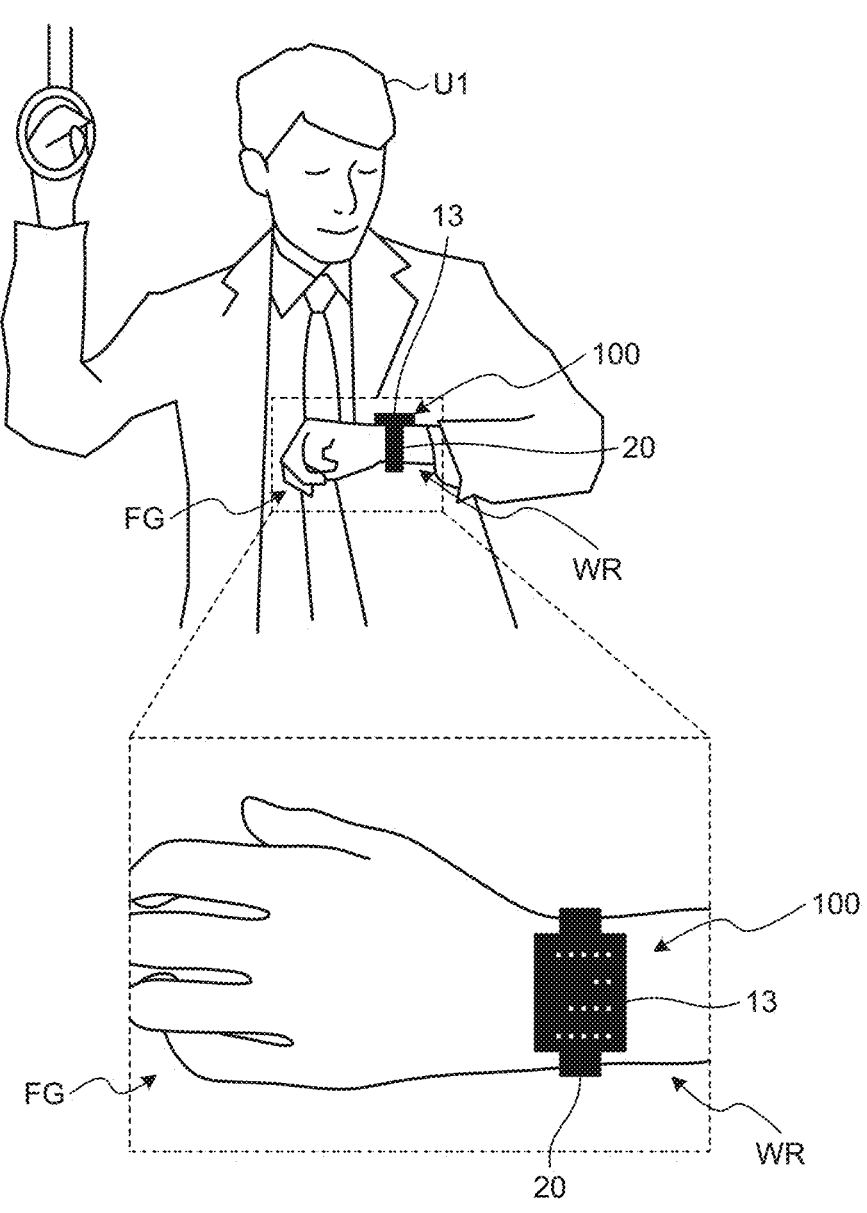
FIG. 1 is a diagram illustrating an example of an information processing device according to an embodiment of the present disclosure.
Figure 2:
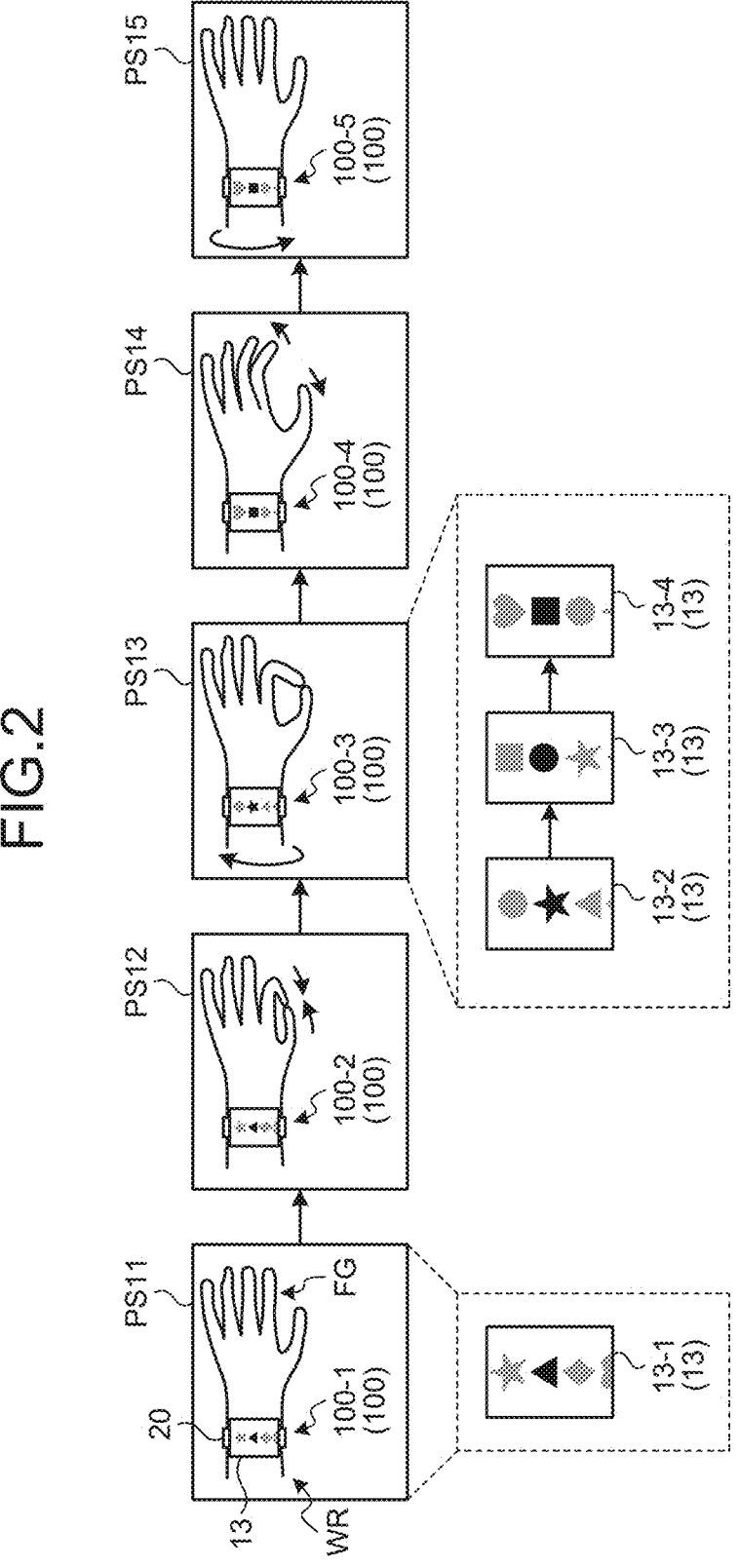
FIG. 2 is a diagram illustrating an example of information processing according to the embodiment of the present disclosure.

1-1. Overview of Configuration and Processing of Information Processing Device According to Embodiment of Present Disclosure First, an overview of the configuration and processing of an information processing device according to an embodiment of the present disclosure will be described with reference to FIGS. 1 and 2. FIG. 1 is a diagram illustrating an example of an information processing device according to an embodiment of the present disclosure. FIG. 2 is a diagram illustrating an example of information processing according to the embodiment of the present disclosure. Specifically, FIG. 1 is a diagram illustrating an example of an information processing device 100 that is a wristband-type display device worn on a wrist of a user U1. For example, the information processing device 100 may be a so-called smart watch. FIG. 2 is a diagram also illustrating an overview of information processing executed by the information processing device 100 depending on the state of the fingers and the rotation of the wrist of the user U1 wearing the information processing device 100.

Note that the rotation of the wrist in this example refers to, for example, rotating (turning) the wrist about an extending direction (long axis) of the forearm. Hereinafter, in the rotation of the wrist of the user, a direction in which the wrist is rotated inward with respect to the body of the user may be referred to as a first direction, and a direction in which the wrist is rotated outward with respect to the body of the user may be referred to as a second direction. For example, rotation of the wrist in the first direction is also referred to as inward rotation, and rotation of the wrist in the first direction is also referred to as outward rotation.

Illustrated in FIG. 1 is a case where the user U1 wears the information processing device 100, which is a wristband-type display device, on the left wrist. The device configuration of the information processing device 100 will be described later in detail. In FIG. 1, illustrated is a state in which the user U1 with a band unit 20 of the information processing device 100 wound around the left wrist visually recognizes a display unit 13 that is a display screen of the information processing device 100.

The information processing device 100 detects the state of fingers FG of the user U1 and the rotation of the left wrist WR (also simply referred to as the "wrist WR") of the user U1 by a sensor unit 16 (see FIG. 3) and performs processing using first information indicating the detected state of the fingers FG of the user U1 and second information indicating rotation of the wrist WR of the user U1. Specifically, the information processing device 100 determines an output mode of the content to be output on the basis of the state of the fingers FG of the user U1 and the rotation of the wrist WR of the user U1. In FIG. 1, the information processing device 100 determines a display mode of the content displayed on the display unit 13 on the basis of the state of the fingers FG of the user U1 and the rotation of the wrist WR of the user U1. Note that a target for which an output mode is to be determined is not limited to screen display and may be sound or the like, which will be described later.

An example of information processing depending on the state of the fingers FG of the user U1 and the rotation of the wrist WR of the user U1 will be described below with reference to FIG. 2. Note that, in FIG. 2, information processing devices 100-1 to 100-5 are illustrated for corresponding processing situations PS11 to PS15; however, these are the same information processing device 100 worn on the wrist WR of the user U1 and are described as the information processing device 100 when description is given without particularly distinguishing them. In addition, in FIG. 2, for simplification of illustration, the reference signs of the display unit 13, the band unit 20, the fingers FG, and the wrist WR are indicated only in the processing situation PS11. Furthermore, in FIG. 2, display units 13-1 to 13-4 are illustrated corresponding to display modes; however, they are the display unit 13 of the same information processing device 100 and will be referred to as the display unit 13 when description is given without particularly distinguishing them.

Furthermore, in FIG. 2, in order to explain a change of a display mode, a case in which the content in which a plurality of figures such as a star-shaped figure, a triangular figure, a rhomboid figure, a circular figure, a rectangular figure, and a heart-shaped figure are arranged side by side in the up-down direction is displayed on the display unit 13 will be described as an example. In addition, in FIG. 2, illustrated is a case where a figure displayed at the center of the display unit 13 in the up-down direction is selected (designated). Note that, in FIG. 2, the figure displayed at the center that has been selected (designated) is illustrated in a deeper color than the other figures, thereby making that the figure displayed at the center to be focused and indicating that the figure has been selected (designated).

Furthermore, in FIG. 2, a case where the condition for accepting a change of the output mode of the content is a state in which the tip of the index finger and the tip of the thumb of the user are in contact with each other will be described as an example. That is, illustrated in FIG. 2 is a case where the information processing device 100 determines to accept a change of the display of the content by the rotation of the wrist WR of the user U1 in a case where the fingers FG of the user U1 is a state in which a space between the index finger and the thumb is closed, namely, a gesture of a so-called OK sign. Note that the processing illustrated in FIG. 2 is merely an example, and the condition for accepting a change of the output mode of the content is not limited to the gesture of the OK sign and may be any shape; however, this point will be described later.

First, the situation PS11 which is a first processing situation illustrated in FIG. 2 indicates a state in which the index finger and the thumb of the user U1 are not closed and the information processing device 100-1 in this situation. The display unit 13-1 indicates a display mode of the content in the situation PS11. The display unit 13-1 displays the star-shaped figure at an upper portion in the up-down direction, the triangular figure at the center, the rhomboid figure at a lower portion, and a part of the heart-shaped figure at the lower end.

For example, even in a case where the user U1 rotates the wrist WR in the situation PS11, the information processing device 100 evaluates that the state of the fingers FG of the user U1 does not satisfy the condition and determines not to change the output mode of the content corresponding to the rotation of the wrist WR of the user U1. That is, the information processing device 100 maintains the display mode of the display unit 13-1 even in a case where the user U1 rotates the wrist WR in the situation PS11.

The situation PS12 which is a second processing situation illustrated in FIG. 2 indicates a state, in which the user U1 brings the tip of the index finger and the tip of the thumb into contact with each other and the index finger and the thumb of the user U1 are closed, and the information processing device 100-2 in this situation. For example, the situation PS12 indicates a situation in which the user U1 performs a motion of pinching with fingers FG. Note that the situation PS12 indicates the situation before the rotation of the wrist WR of the user U1, and the display mode of the display unit 13 in the information processing device 100-2 is similar to the display mode of the display unit 13-1.

The situation PS13 which is a third processing situation illustrated in FIG. 2 illustrates a situation, in which the wrist WR of the user U1 is rotated in a state where the index finger and the thumb of the user U1 are closed, and the information processing device 100-3 in this situation. For example, the situation PS13 indicates a situation in which the user U1 performs a motion of turning the wrist WR. Specifically, the situation PS13 indicates a situation in which the left wrist WR of the user U1 is rotated (outward rotation) in the outward direction (second direction).

In a case where the user U1 rotates the wrist WR in state where the index finger and the thumb of the user U1 are closed, the information processing device 100 evaluates that the state of the fingers FG of the user U1 satisfies the condition and determines to change the output mode of the content corresponding to the rotation of the wrist WR of the user U1. That is, in a case where the user U1 rotates the wrist WR in the situation PS13, the information processing device 100 changes the display mode of the display unit 13 depending on the direction and the amount of rotation of the wrist WR of the user U1. The information processing device 100 determines to move the display area (display range) of the content upward depending on the rotation of the wrist WR of the user U1 in the second direction. The information processing device 100 displays, on the display unit 13, the display area of the content moved upward depending on the direction and the amount of rotation of the wrist WR of the user U1 in the second direction.

The display units 13-2 to 13-4 indicate changes in the display mode of the content in the case where the wrist WR of the user U1 is rotated in the second direction. The display unit 13-2 displays the circular figure at the upper portion in the up-down direction, the star-shaped figure at the center, the triangular figure at the lower portion, and a part of the rhomboid figure at the lower end. That is, the display unit 13-2 indicates the case where the display area of the content is moved upward from the display unit 13-1 depending on the rotation of the wrist WR of the user U1 in the second direction. Specifically, the display unit 13-2 indicates a case where an area where the circular figure is disposed, which has been outside the display area in the display unit 13-1, enters the display area, and an area where the rhomboid figure has been disposed is substantially outside the display area.

The display unit 13-3 indicates a case where the user U1 further rotates the wrist WR in the second direction from the state of the display unit 13-2. The display unit 13-3 displays the rectangular figure at the upper portion in the up-down direction, the circular figure at the center, the star-shaped figure at the lower portion, and a part of the triangular figure at the lower end. That is, the display unit 13-3 indicates the case where the display area of the content is moved upward from the display unit 13-2 depending on the rotation of the wrist WR of the user U1 in the second direction. Specifically, the display unit 13-3 indicates a case where an area where the rectangular figure is disposed, which has been outside the display area in the display unit 13-2, enters the display area, and an area where the triangular figure has been disposed is substantially outside the display area.

The display unit 13-4 indicates a case where the user U1 further rotates the wrist WR in the second direction from the state of the display unit 13-3. The display unit 13-4 displays the heart-shaped figure at the upper portion in the up-down direction, the rectangular figure at the center, the circular figure at the lower portion, and a part of the star-shaped figure at the lower end. That is, the display unit 13-4 indicates the case where the display area of the content is moved upward from the display unit 13-3 depending on the rotation of the wrist WR of the user U1 in the second direction. Specifically, the display unit 13-4 indicates a case where an area where the heart-shaped figure is disposed, which has been outside the display area in the display unit 13-3, enters the display area, and the area where the star-shaped figure has been disposed is substantially outside the display area. Note that, in a case where the wrist WR of the user U1 is further rotated in the second direction of in the state where the index finger and the thumb of the user U1 are closed (which is not illustrated in FIG. 2), the information processing device 100 determines to change the display area of the content such that the heart-shaped figure is positioned at the center. In this case, the information processing device 100 displays the heart-shaped figure at the center in the up-down direction, the rectangular figure at the lower portion, and a part of the circular figure at the lower end. In this manner, the information processing device 100 determines an amount corresponding to the amount of rotation of the wrist of the user as the change amount of the output mode of the content.

The situation PS14 which is a fourth processing situation illustrated in FIG. 2 indicates a state, in which the user U1 releases the tip of the index finger and the tip of the thumb apart and the index finger and the thumb of the user U1 are not closed, and the information processing device 100-4 in this situation. For example, the situation PS14 indicates a situation in which the user U1 performs a motion of releasing the pinching fingers FG.

For example, even in a case where the user U1 rotates the wrist WR in the situation PS14, the information processing device 100 evaluates that the state of the fingers FG of the user U1 does not satisfy the condition and determines not to change the output mode of the content corresponding to the rotation of the wrist WR of the user U1. That is, the information processing device 100 maintains the display mode of the display unit 13-4 even in a case where the user U1 rotates the wrist WR in the situation PS14.

The situation PS15 which is a fifth processing situation illustrated in FIG. 2 illustrates a situation, in which the wrist WR of the user U1 is rotated in a state where the index finger and the thumb of the user U1 are not closed, and the information processing device 100-5 in this situation. For example, the situation PS15 indicates a situation in which the user U1 turns the wrist WR backward and returns to the situation PS11. Specifically, the situation PS15 indicates a situation in which the left wrist WR of the user U1 is rotated (inward rotation) in the inward direction (first direction).

In a case where the user U1 rotates the wrist WR in the state where the index finger and the thumb of the user U1 are closed, the information processing device 100 evaluates that the state of the fingers FG of the user U1 does not satisfy the condition and determines not to change the output mode of the content corresponding to the rotation of the wrist WR of the user U1. That is, the information processing device 100 maintains the display mode of the display unit 13-4 even in a case where the user U1 rotates the wrist WR in the situation PS15. Note that the information processing device 100 determines to move the display area of the content downward in a case where the wrist WR of the user U1 is rotated in the first direction in the state where the index finger and the thumb of the user U1 are closed. In this case, the information processing device 100 displays, on the display unit 13, the display area of the content moved downward depending on the direction and the amount of rotation of the wrist WR of the user U1 in the first direction.

As described above, the information processing device 100 determines the output mode of the content output from the device on the basis of the state of the fingers of the user and the rotation of the wrist of the user indicated by the second information, whereby the output mode of the content can be determined using the two motions of the user, namely, the state of the fingers and the rotation of the wrist of the user. Therefore, the information processing device can appropriately provide the information output service depending on the motion of the user.

In the processing illustrated in FIG. 2, in a case where a GUI of a menu list displayed on the display unit 13 which is a screen display unit of the information processing device 100 which is a wristband device is scrolled up and down, turning the wrist while being in the state of a posture of pinching with the fingers results in scrolling in a direction corresponding to the turning direction. For example, in a case of the left hand operation, in the information processing device 100, when the palm is turned from a state of facing downward to a state of facing upward while being in the posture of pinching with the fingers, the GUI menu flows from the top to the bottom. Furthermore, in the information processing device 100, turning the palm in the opposite direction while being in the posture of pinching with the fingers, the GUI menu flows from down to up. In the state where the index finger and the thumb are opened, the information processing device 100 does not scroll the GUI even when the wrist is turned. As a result, the user using the information processing device 100 can perform a continuous scrolling operation by combining the rotational motion of the wrist with a motion of opening or closing the space between the index finger and the thumb.

1-1-1. Background and Effects

In a conventional wristband-type (wrist-worn type) display device, many graphical user interface (GUI) operations on a screen include touch operations on the screen and button operations. However, in the case of a touch operation on a small display area such as a wristband-type wearable display, much of the screen is hidden by a fingertip touching thereon, and thus the visibility during the operation is poor, and the range in which the touching fingers can move is also narrow. Therefore, it is difficult to perform a scroll operation or the like as compared with a large screen such as that of a smartphone. In addition, for example, it is difficult to perform the GUI operation in a state where the posture of one hand is limited, such as the performing GUI operation while gripping a strap on a train.

Meanwhile, the information processing device 100 can be operated with one hand, whereby the convenience can be improved. In this manner, the information processing device 100 accepts one-hand operation of the wristband by the rotational motion of the wrist. As a result, the information processing device 100 can enable an intuitive user interface (UI) operation with one hand by sensing the rotational motion of the wrist and the posture of the fingers and using the sensing result in the UI operation in a wristband-type wearable device. As described above, the information processing device 100 is a wrist-worn-type display device that senses the rotation of the wrist and the degree of opening of the fingers of the hand and can enable the user to perform an intuitive operation on the GUI or various devices.

1-2. Configuration of Information Processing Device According to Embodiment

Figure 3:
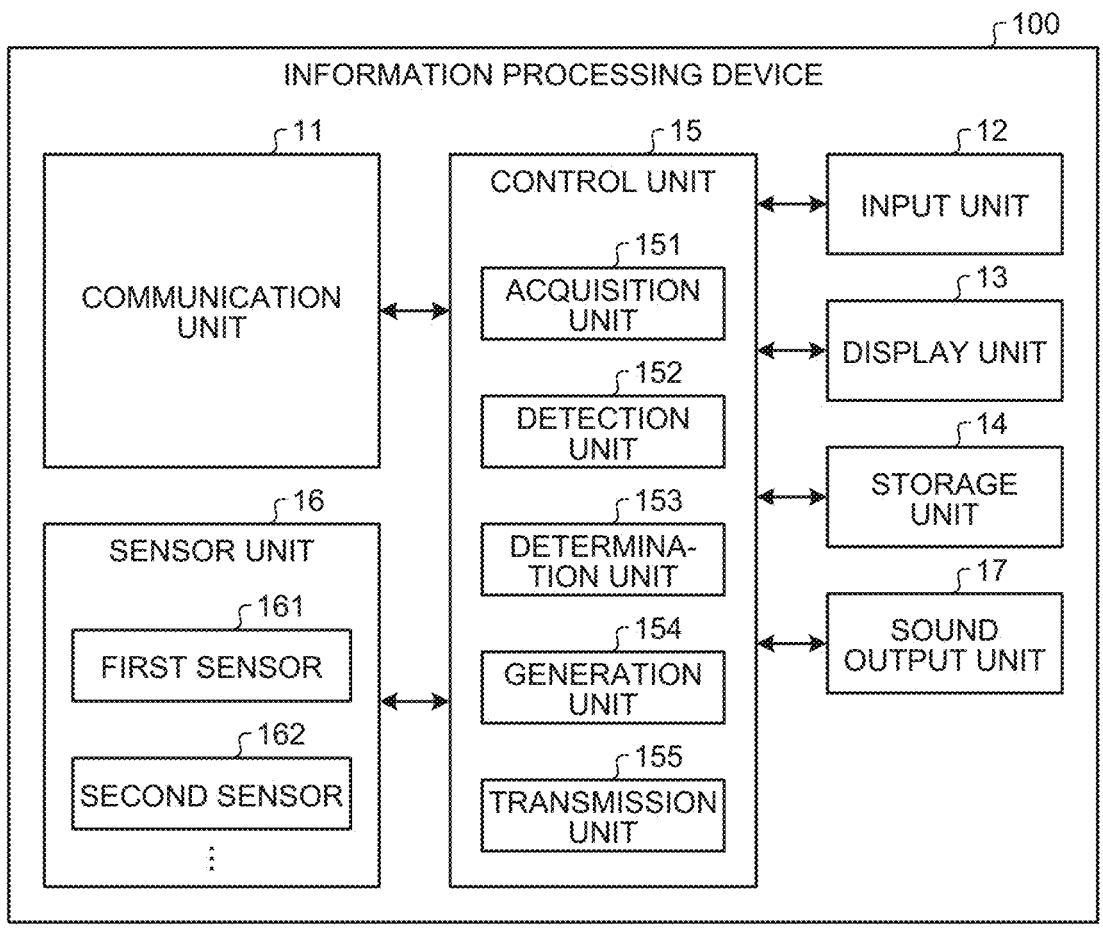
FIG. 3 is a diagram illustrating a configuration example of the information processing device according to the embodiment of the disclosure.

Next, the configuration of the information processing device 100 which is an example of an information processing device that executes the information processing of the embodiment will be described. FIG. 3 is a diagram illustrating a configuration example of the information processing device 100 according to the embodiment of the disclosure. For example, the information processing device 100 illustrated in FIG. 3 is an example of the information processing device. The information processing device 100 is a computer that implements the functions as the information processing device to be described later.

As illustrated in FIG. 3, the information processing device 100 includes a communication unit 11, an input unit 12, a display unit 13, a storage unit 14, a control unit 15, a sensor unit 16, and a sound output unit 17.

The communication unit 11 is implemented by, for example, a network interface card (NIC), a communication circuit, or the like. The communication unit 11 is connected with a communication network N (a network such as the Internet) in a wired or wireless manner and transmits and receives information to and from other devices and the like via a communication network N.

Various operations are input from a user to the input unit 12. The input unit 12 receives the input by the user. For example, the input unit 12 may receive various operations from the user such as an operator via a display plane (for example, the display unit 13) by a touch panel function. Furthermore, the input unit 12 may receive various operations by a button or the like included in the information processing device 100. The input unit 12 may receive user's input by speech via a microphone or the like. The input unit 12 may receive various operations by user's utterance.

The display unit 13 displays various types of information. The display unit 13 functions as an output unit that outputs various types of information. The display unit 13 is a display (display screen) implemented by, for example, a liquid crystal display, an organic electro-luminescence (EL) display, or the like and is a display device for displaying various types of information. The display unit 13 displays information of a detection result by a detection unit 152. The display unit 13 displays information determined by a determination unit 153. The display unit 13 displays information generated by a generation unit 154. The display unit 13 outputs the content by an output mode determined by the determination unit 153.

The storage unit 14 is implemented by, for example, a semiconductor memory element such as a random access memory (RAM) or a flash memory or a storage device such as a hard disk or an optical disk. The storage unit 14 stores various types of information necessary for processing. The storage unit 14 stores various types of information regarding the content displayed on the display unit 13. For example, the storage unit 14 stores the content to be displayed on the display unit 13. For example, the storage unit 14 stores various types of information such as information necessary for displaying information such as images and information necessary for information processing. The storage unit 14 stores information on a detection result by the sensor unit 16. For example, the storage unit 14 stores information to be displayed on the basis of the detection result.

For example, the storage unit 14 stores information detected by the sensor unit 16. For example, the storage unit 14 stores information used for estimation of (specifying) the state of the fingers. For example, the storage unit 14 stores information used for estimation of (specifying) the rotation of the wrist. For example, the storage unit 14 stores images used for estimation of (specifying) the state of the fingers and the rotation of the wrist. Note that the above is merely an example, and the storage unit 14 stores various types of information used for provision of a service to the user.

Furthermore, for example, the storage unit 14 may store information of a speech recognition application (program) that implements a speech recognition function. For example, the information processing device 100 can execute speech recognition by activating the speech recognition application (also simply referred to as "speech recognition"). The storage unit 14 may store various types of information used for speech recognition. The storage unit 14 may store information of a dictionary (speech recognition dictionary) used as a speech recognition dictionary. The storage unit 14 may store information of a plurality of speech recognition dictionaries.

The control unit 15 is implemented by, for example, a central processing unit (CPU), a micro processing unit (MPU), or the like executing a program (for example, the information processing program according to the disclosure)

stored inside the information processing device 100 using a random access memory (RAM) or the like as a work area. The control unit 15 is also a controller and may be implemented by, for example, an integrated circuit such as an application specific integrated circuit (ASIC) or a field programmable gate array (FPGA).

As illustrated in FIG. 3, the control unit 15 includes an acquisition unit 151, a detection unit 152, a determination unit 153, a generation unit 154, and a transmission unit 155 and implements or executes a function or an action of information processing described below. Note that the internal configuration of the control unit 15 is not limited to the configuration illustrated in FIG. 3 and may be another configuration as long as information processing described below is performed.

The acquisition unit 151 acquires various types of information. The acquisition unit 151 acquires various types of information from an external information processing device. The acquisition unit 151 acquires various types of information from the storage unit 14. The acquisition unit 151 acquires information received by the input unit 12.

The acquisition unit 151 acquires various types of information detected by the detection unit 152. The acquisition unit 151 acquires various types of information determined by the determination unit 153. The acquisition unit 151 acquires various types of information generated by the generation unit 154. The acquisition unit 151 acquires sensor information detected by the sensor unit 16.

The acquisition unit 151 acquires the first information indicating the state of the fingers of the user. The acquisition unit 151 acquires the second information indicating the rotation of the wrist of the user.

The detection unit 152 performs detection processing. The detection unit 152 detects various types of information. The detection unit 152 detects various types of information on the basis of information acquired from an external information processing device. The detection unit 152 detects various types of information on the basis of the information stored in the storage unit 14.

The detection unit 152 detects the first information indicating the state of the fingers of the user. The detection unit 152 detects the first information by a first sensor 161. The detection unit 152 detects the second information indicating the rotation of the wrist of the user. The detection unit 152 detects the second information by a second sensor 162.

The determination unit 153 performs determination processing. The determination unit 153 makes various types of determination. The determination unit 153 determines various types of information on the basis of the information stored in the storage unit 14. The determination unit 153 determines various types of information on the basis of the information acquired by the acquisition unit 151. The determination unit 153 determines various types of information on the basis of the information detected by the detection unit 152.

The determination unit 153 performs various types of evaluation. The determination unit 153 performs various types of evaluation on the basis of the information stored in the storage unit 14. The determination unit 153 performs various types of evaluation on the basis of the information acquired by the acquisition unit 151. The determination unit 153 performs various types of evaluation on the basis of the information detected by the detection unit 152.

The determination unit 153 determines the output mode of the content output from the device on the basis of the state of the fingers of the user indicated by the first information and the rotation of the wrist of the user indicated by the second information. The determination unit 153 determines the display mode of the content displayed on the device, which is a display device, on the basis of the state of the fingers of the user and the rotation of the wrist of the user. The determination unit 153 determines whether or not to change the output mode of the content depending on the state of the fingers of the user and determines the amount of change in the output mode of the content by the rotation of the wrist of the user.

The determination unit 153 determines an amount corresponding to the amount of rotation of the wrist of the user as the change amount of the output mode of the content. The determination unit 153 determines to change to one side of one dimension corresponding to the content in a case where the rotation of the wrist of the user is in the first direction and to change to the other side of the one dimension corresponding to the content in a case where the rotation of the wrist of the user is in the second direction opposite to the first direction.

In a case where the one dimension corresponds to the output amount of the content, the determination unit 153 determines to decrease the output amount of the content depending on the rotation of the wrist of the user in the first direction and to increase the output amount of the content depending on the rotation of the wrist of the user in the second direction. In a case where the one dimension corresponds to the display area of the content, the determination unit 153 determines to decrease the display area of the content depending on the rotation of the wrist of the user in the first direction and to increase the display area of the content depending on the rotation of the wrist of the user in the second direction.

In a case where the one dimension corresponds to the output volume of the content, the determination unit 153 determines to decrease the output volume of the content depending on the rotation of the wrist of the user in the first direction and to increase the output volume of the content depending on the rotation of the wrist of the user in the second direction. In a case where the one dimension corresponds to the up-down direction of the content, the determination unit 153 determines to move the display area of the content downward depending on the rotation of the wrist of the user in the first direction and to move the display area of the content upward depending on the rotation of the wrist of the user in the second direction.

In a case where the state of the fingers of the user satisfies the condition, the determination unit 153 determines to change the output mode of the content corresponding to the rotation of the wrist of the user. In a case where the state of the fingers of the user does not satisfy the condition, the determination unit 153 determines not to change the output mode of the content corresponding to the rotation of the wrist of the user.

In a case where the state of the fingers of the user corresponds to the gesture corresponding to a change in the output of the content, the determination unit 153 determines to change the output mode of the content corresponding to the rotation of the wrist of the user. In a case where the state of the fingers of the user has a shape corresponding to a change in the output of the content, the determination unit 153 determines to change the output mode of the content corresponding to the rotation of the wrist of the user.

The generation unit 154 performs generation processing of generating various types of information. The generation unit 154 generates various types of information on the basis of the information stored in the storage unit 14. The generation unit 154 generates various types of information on the basis of the information acquired by the acquisition unit 151. The generation unit 154 generates various types of information on the basis of the information detected by the detection unit 152. The generation unit 154 generates various types of information on the basis of the information determined by the determination unit 153.

The generation unit 154 may generate various types of information to be displayed on the display unit 13. The generation unit 154 may generate various types of information such as character information and image information such as a graph to be displayed on the display unit 13. In this case, the generation unit 154 generates information (image) related to the screen by using various types of conventional technology related to images as appropriate. The generation unit 154 generates an image by using various types of conventional technology related to the GUI as appropriate. For example, the generation unit 154 may generate an image using CSS, Javascript (registered trademark), HTML, or any language capable of describing information processing such as displaying information and receiving operation as described above.

The transmission unit 155 transmits various types of information. The transmission unit 155 provides various types of information. The transmission unit 155 provides various types of information to an external information processing device. The transmission unit 155 transmits various types of information to an external information processing device. The transmission unit 155 transmits the information stored in the storage unit 14. The transmission unit 155 transmits the information acquired by the acquisition unit 151. The transmission unit 155 transmits a detection result by the detection unit 152. The transmission unit 155 transmits the information determined by the determination unit 153. The transmission unit 155 transmits the information generated by the generation unit 154.

Note that each piece of processing by the control unit 15 described above may be implemented by, for example, JavaScript (registered trademark) or the like. Furthermore, in a case where the processing such as information processing by the control unit 15 described above is performed by a predetermined application, each of the units of the control unit 15 may be implemented by, for example, the predetermined application. For example, the processing such as information processing by the control unit 15 may be implemented by control information received from an external information processing device. For example, in a case where the above-described display processing is performed by a predetermined application (for example, an information output application or the like), the control unit 15 may include, for example, an application control unit that controls the predetermined application or a dedicated application.

The sensor unit 16 includes sensors that detect various sensors. In the example of FIG. 3, the sensor unit 16 includes the first sensor 161 and the second sensor 162.

The first sensor 161 is a sensor used to detect the state of user's fingers. For example, the first sensor 161 is an image sensor (camera). The first sensor 161 may be a myoelectric sensor. Note that the above is merely an example, and the first sensor 161 may be any sensor as long as it can detect the state of user's fingers. For example, the first sensor 161 may be an inertial measurement unit (IMU) or the like.

The second sensor 162 is a sensor used to detect the rotation of the wrist of the user. The second sensor 162 is an image sensor (camera). The second sensor 162 may be a gyro sensor. Note that the above is merely an example, and the second sensor 162 may be any sensor as long as it can detect the state of user's fingers. For example, the second sensor 162 may be an optical sensor or the like using infrared rays or the like.

Note that the first sensor 161 and the second sensor 162 may be integrated. For example, in a case where the state of the fingers of the user and the rotation of the wrist of the user are estimated (specified) by an image, the first sensor 161 and the second sensor 162 may be implemented by one image sensor.

Note that the sensor unit 16 may include various sensors in addition to the first sensor 161 and the second sensor 162. The sensor unit 16 may also include a sound sensor that detects sound, such as a microphone. The sensor unit 16 may include a sensor (position sensor) that detects the position of the information processing device 100. For example, the sensor unit 16 may include a global positioning system (GPS) sensor. Furthermore, in a case where position information of the information processing device 100 is acquired as the sensor information, the sensor unit 16 may acquire the position information of the information processing device 100 estimated using position information of the base station with which communication is being performed or a Wireless Fidelity (Wi-Fi) (registered trademark) radio wave.

The sensor unit 16 may further include a sensor (biological signal sensor) for detecting a biological signal of the user. For example, the information processing device 100 may include sensors that detect various biological signals, such as a heart rate sensor that detects a heart rate of the user, an electroencephalographic sensor that detects an electroencephalogram of the user, a pulse sensor (pulse wave sensor) that detects the pulse of the user, a respiration sensor (exhalation sensor) that detects respiration of the user, or a perspiration sensor that detects perspiration of the user. Incidentally, the sensors that detect the various types of information in the sensor unit 16 may be included in a common sensor or may be implemented by different sensors.

The sound output unit 17 functions as an output unit that outputs various types of information. The sound output unit 17 is implemented by a speaker that outputs sound and is an output device for outputting various types of information as sound. The sound output unit 17 outputs the content by sound. The sound output unit 17 outputs the content by the output mode determined by the determination unit 153. For example, the sound output unit 17 outputs sound corresponding to the information displayed on the display unit 13.

1-3. Procedure of Information Processing According to Embodiment

Figure 4:
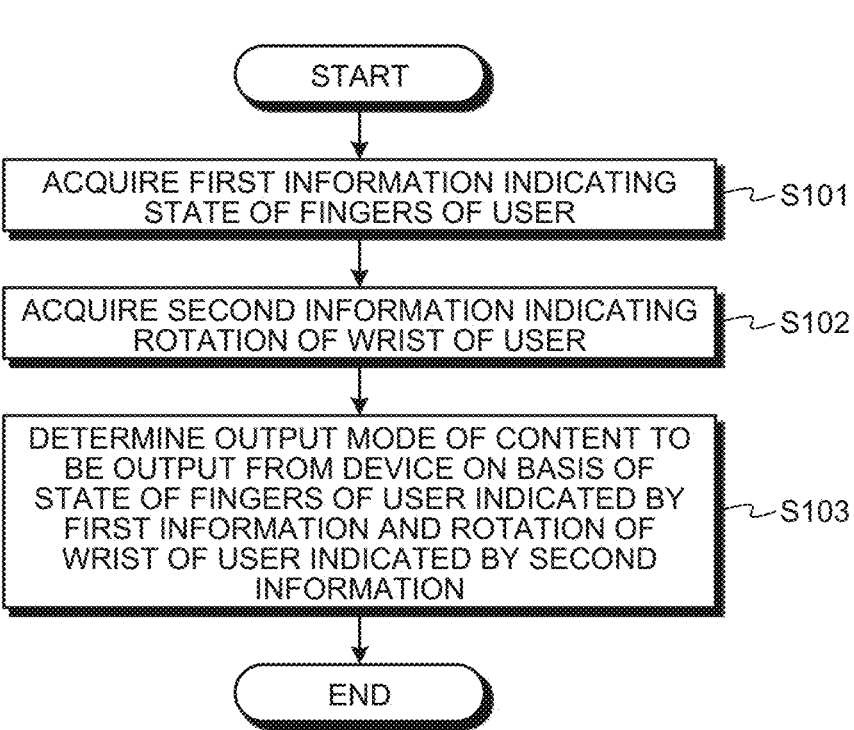
FIG. 4 is a flowchart illustrating a procedure of the information processing according to the embodiment of the present disclosure.

Next, a procedure of the information processing according to the embodiment will be described by referring to FIG. 4. FIG. 4 is a flowchart illustrating the procedure of the information processing according to the embodiment of the present disclosure.

As illustrated in FIG. 4, the information processing device 100 acquires the first information indicating the state of the fingers of a user (Step S101). The information processing device 100 acquires the second information indicating the rotation of the wrist of the user (Step S102).

An output mode of the content to be output from the device is determined on the basis of the state of the fingers of the user indicated by the first information and the rotation of the wrist of the user indicated by the second information (Step S103).

1-4. Specific Examples

Hereinafter, specific examples of various configurations and pieces of processing will be described with reference to FIGS. 5 to 10. Note that description of similar points to those described above will be omitted as appropriate.

[1-4-1. Exemplary Structure for Holding Position of Display Unit]

In a case where the above-described rotation of the wrist of the user is used for operation, since the operation involves a rotational motion of the wrist of the user, screen display, namely, the visibility of the display unit 13 may be deteriorated depending on the rotation angle of the wrist. Therefore, it is desirable to hold the position of the display unit 13 even in the case where the wrist of the user is rotated. The information processing device 100 desirably has a structure for holding the position of the display unit 13.

Figure 5:
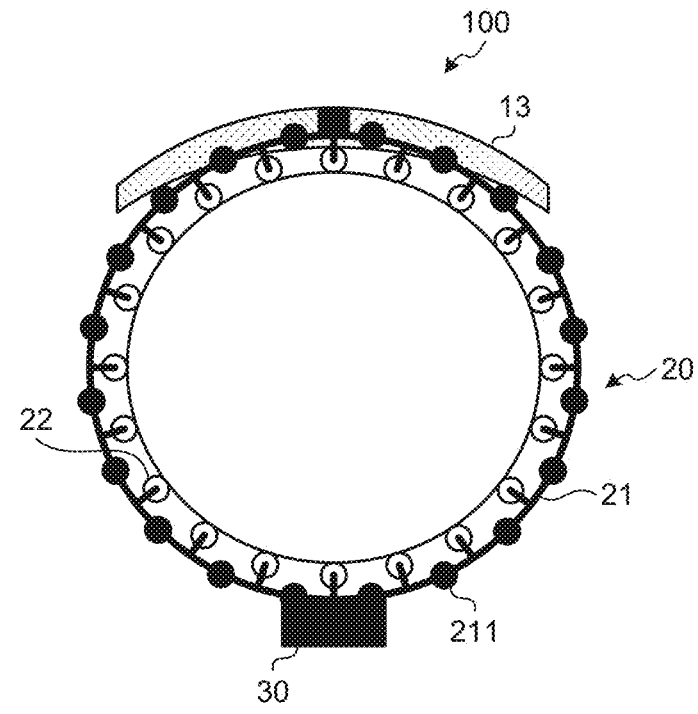
FIG. 5 is a diagram illustrating an example of a structure for holding the position of a display unit.
Figure 6:
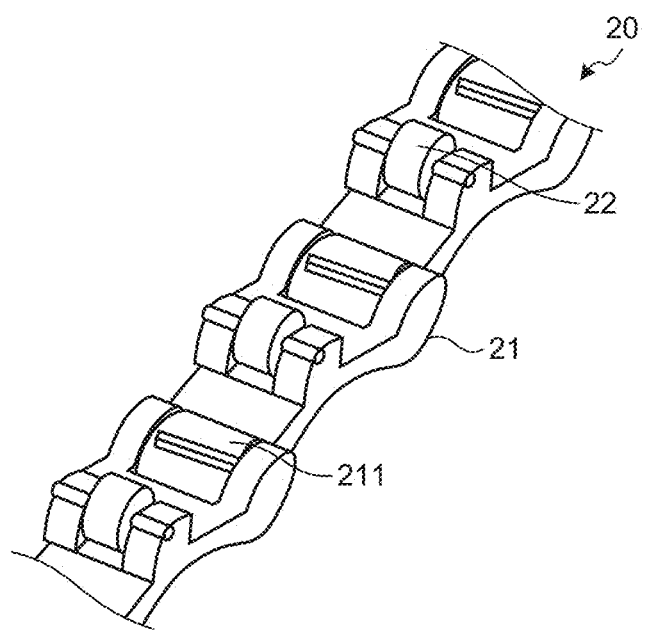
FIG. 6 is a diagram illustrating an example of the main part of the structure for holding the position of the display unit.

An exemplary structure for holding the position of the display unit will be described with reference to FIGS. 5 and 6. FIG. 5 is a diagram illustrating an example of a structure for holding the position of the display unit. FIG. 6 is a diagram illustrating an example of the main part of the structure for holding the position of the display unit.

As illustrated in FIG. 5, the band unit 20 of the information processing device 100 includes a circumferential unit 21 disposed along the circumferential direction of the wrist of the user and a plurality of bearing units 22 arranged at predetermined intervals along the inner circumference of the circumferential unit 21. The bearing units 22 are disposed on the inner circumferential side and are disposed in such a manner as to rotate along the circumferential direction of the circumferential unit 21. Note that a circle illustrated inside the bearing units 22 in FIG. 5 schematically indicates the wrist of the user when the information processing device 100 is worn on the wrist of the user.

The circumferential unit 21 includes a plurality of hinge units 211 at predetermined intervals along the circumferential direction. As illustrated in FIGS. 5 and 6, the hinge units 211 are provided between the bearing units 22 along the circumferential direction. For example, the circumferential unit 21 includes a plurality of parts, to each of which a bearing unit 22 is attached, which is connected by the hinge units 211. In the band unit 20 illustrated in FIGS. 5 and 6, the bearing units 22 come into contact with the wrist of the user. With the bearing units 22 in contact with the wrist of the user rotating depending on the rotation of the wrist of the user, the band unit 20 is held at a predetermined position without rotating together with the rotation of the wrist of the user wearing the information processing device 100.

The information processing device 100 further includes a weight 30 that functions as a holding unit at a position facing the position where the display unit 13 is disposed in the circumferential unit 21 of the band unit 20. For example, a member heavier than the display unit 13 is used as the weight 30. For example, in a case where the axis (long axis) of the wrist of the user wearing the information processing device 100 intersects the gravity direction, the portion of the information processing device 100 where the weight 30 is disposed is located on the lower side. As a result, in FIGS. 5 and 6, the portion of the information processing device 100 where the display unit 13 is disposed is located on the upper side.

That is, in FIGS. 5 and 6, even when the user wearing the information processing device 100 rotates the wrist, by the bearing units 22, the information processing device 100 holds a position corresponding to the disposition of the weight 30 without rotating together with the rotation of the wrist of the user.

As described above, in a case where the user rotates the wrist, the weight 30 of the information processing device 100 illustrated in FIGS. 5 and 6 functions as the holding unit that holds the position of the display unit 13 in the circumferential direction of the wrist of the user at a holding position that is the position before the rotation of the wrist of the user. The weight 30 is movable together with the display unit 13 along the circumferential direction of the wrist of the user when worn on the wrist of the user. When worn on the wrist of the user, the weight 30 is disposed at a position different from that of the display unit 13 in the circumferential direction of the wrist of the user. In FIGS. 5 and 6, the weight 30 is disposed at a position facing the position where the display unit 13 is disposed. Furthermore, the display unit 13 of the information processing device 100 is movable along the circumferential direction of the wrist of the user when worn on the wrist of the user. In a case where the user rotates the wrist about a direction intersecting the gravity direction, the display unit 13 is held at the holding position since the weight 30 is held at a position in the circumferential direction of the wrist of the user. The display unit 13 is held at the holding position corresponding to a difference from the weight 30 in terms of position in the circumferential direction of the wrist of the user.

As described above, in the information processing device 100, the band unit 20 includes the bearing units 22 which are a mechanism having a quite low friction with a portion of the body wearing the band unit 20, and it is designed such that the center of gravity of the band unit 20 is located on the palm side at the time of wearing, whereby good visibility can be ensured in any state of rotation of the wrist. For example, the information processing device 100 detects a rotational movement distance of the device with respect to the wrist by an infrared sensor or the like and reflects the detected rotational movement distance on the movement distance of scrolling. Furthermore, the information processing device 100 can hold the display unit 13 at any position by including a mechanism capable of freely adjusting the position of the weight 30.

[1-4-2. Example of State of Fingers]

As described above, the state of the fingers as a condition for accepting a change in the output mode of the content may be of any shape. An example will be described below with regard to this point.

[1-4-2-1. Example of First State]

Figure 7:
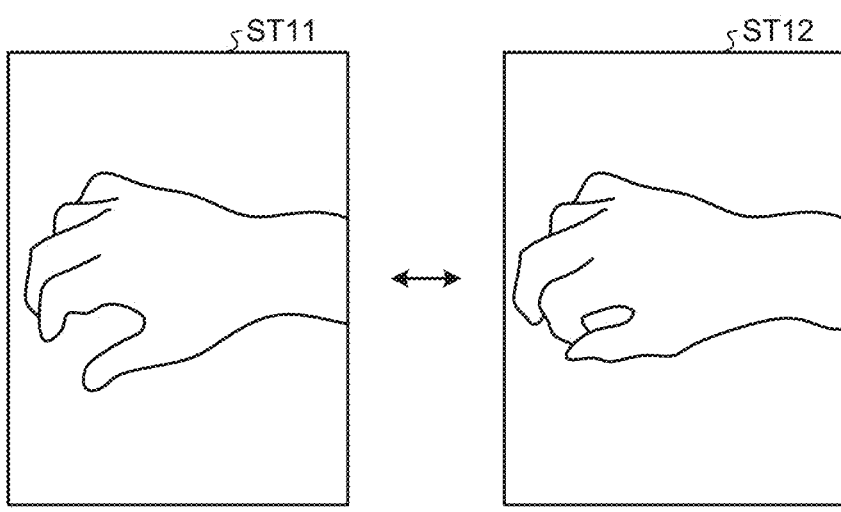
FIG. 7 is a diagram illustrating an example of a state of fingers.

First, an example of first state will be described with reference to FIG. 7. FIG. 7 is a diagram illustrating an example of state of fingers. The example illustrated in FIG. 7 illustrates a case where it is determined to accept the change of the display of the content by rotation of the wrist of the user in a case where the state of the fingers of the user described in FIG. 2 is the state in which the space between the index finger and the thumb is closed.

A state ST11 in FIG. 7 indicates the state in which the index finger and the thumb are opened. For example, in a case where the state of the fingers of the user is the state ST11, the information processing device 100 evaluates that the state of the fingers of the user does not satisfy the condition even if the user rotates the wrist and determines not to change the output mode of the content corresponding to the rotation of the wrist of the user. For example, even in a case where the user rotates the wrist in the state ST11 of the fingers of the user, the information processing device 100 maintains the display mode before rotation of the wrist of the user.

A state ST12 in FIG. 7 indicates the state in which the index finger and the thumb are closed. For example, in a case where the state of the fingers of the user is the state ST12, the information processing device 100 evaluates that the state of the fingers of the user satisfies the condition when the user rotates the wrist and determines to change the output mode of the content corresponding to the rotation of the wrist of the user. For example, in a case where the user rotates the wrist in the state ST12 of the fingers of the user, the information processing device 100 changes the display mode of the content depending on the direction and the amount of the rotation of the wrist of the user.

[1-4-2-2. Example of Second State]

Figure 8:
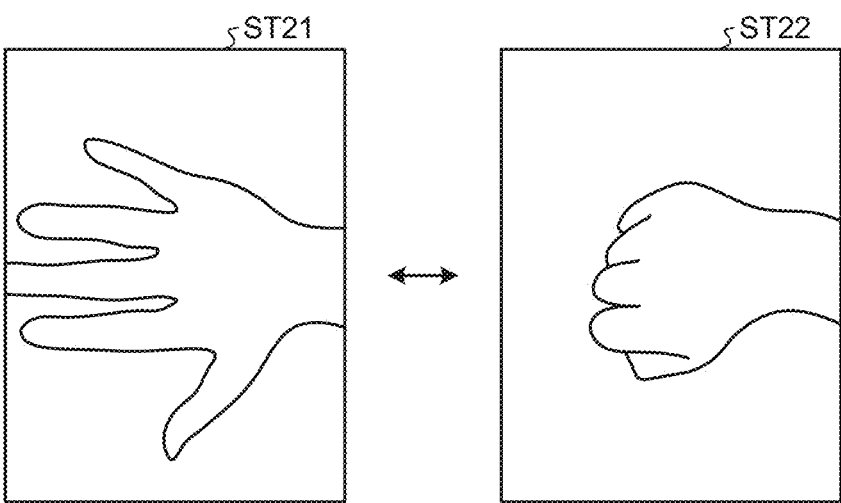
FIG. 8 is a diagram illustrating an example of a state of fingers.

Next, an example of second state will be described with reference to FIG. 8. FIG. 8 is a diagram illustrating an example of a state of fingers. The example illustrated in FIG. 8 illustrates a case where it is determined to accept a change of display of the content by rotation of the wrist of the user in a state where the hand of the user is a closed fist.

A state ST21 in FIG. 8 indicates a state in which a hand, namely, the five fingers, are opened. For example, in a case where the state of the fingers of the user is the state ST21, the information processing device 100 evaluates that the state of the fingers of the user does not satisfy the condition even if the user rotates the wrist and determines not to change the output mode of the content corresponding to the rotation of the wrist of the user. For example, even in a case where the user rotates the wrist in the state ST21 of the fingers of the user, the information processing device 100 maintains the display mode before rotation of the wrist of the user.

A state ST22 in FIG. 8 indicates a state in which the hand (fist), namely, the five fingers are closed. For example, in a case where the state of the fingers of the user is the state ST22, the information processing device 100 evaluates that the state of the fingers of the user satisfies the condition when the user rotates the wrist and determines to change the output mode of the content corresponding to the rotation of the wrist of the user. For example, in a case where the user rotates the wrist in the state ST22 of the fingers of the user, the information processing device 100 changes the display mode of the content depending on the direction and the amount of the rotation of the wrist of the user.

[1-4-3. Example of Rotation of Wrist and Operation Target]

Figure 9:
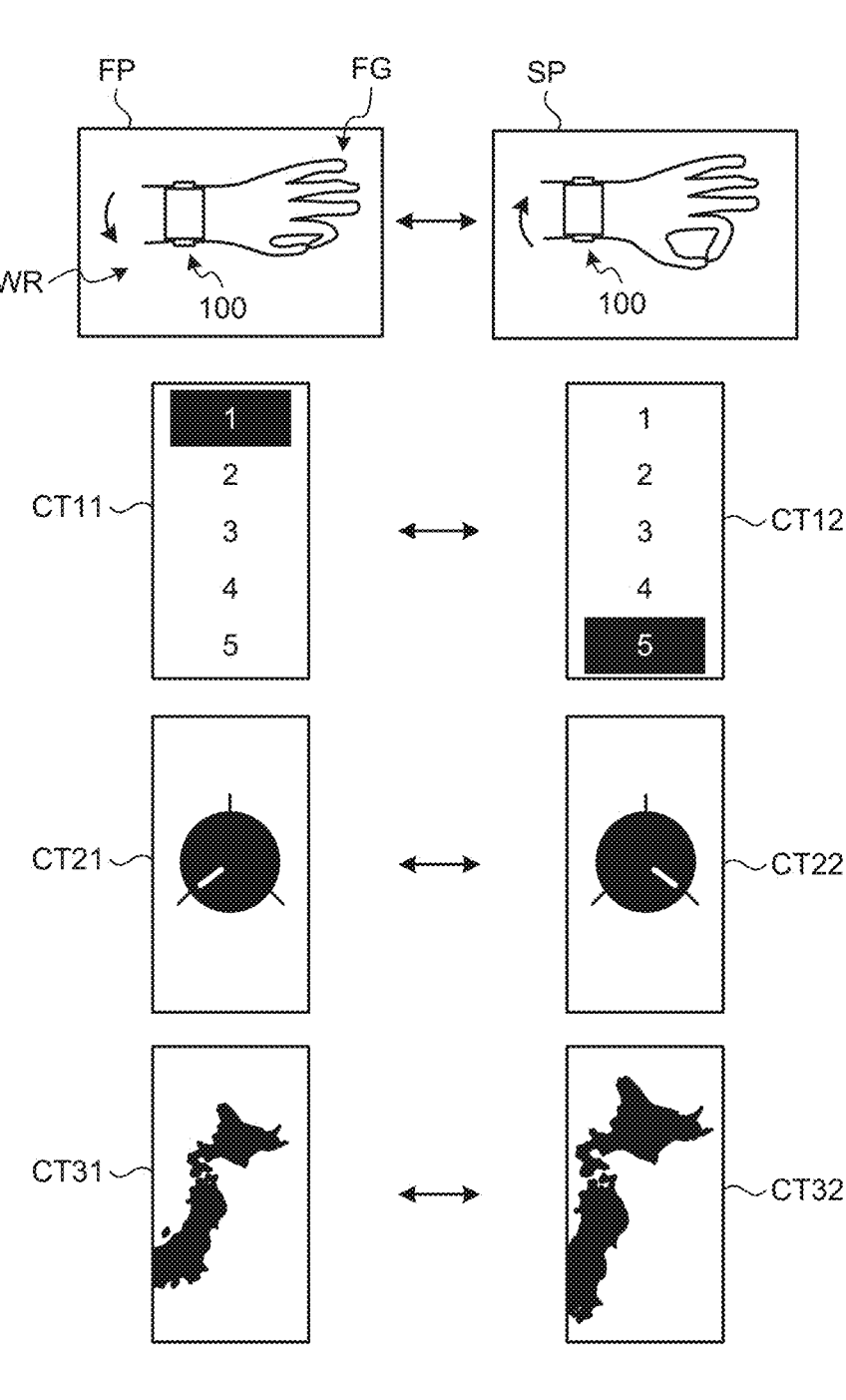
FIG. 9 is a diagram illustrating an example of rotation of the wrist and operation targets.

Note that, in the above-described example, as an example of determining the output mode of the content, a case where the display area (range) of the content is moved in the up-down direction has been described as an example. However, the target output mode of the content is not limited to the display area of the content and may be various targets. That is, the information processing device 100 may use rotation of the wrist for GUI operations such as moving the focus, level adjustment, and size adjustment such as enlargement and reduction, in addition to the scroll operation. This point will be described with reference to FIG. 9. FIG. 9 is a diagram illustrating an example of rotation of the wrist and operation targets.

A first situation FP in FIG. 9 indicates a situation in which a left wrist WR of a user U1 wearing the information processing device 100 is rotated (inward rotation) in the inward direction (first direction). A second situation SP in FIG. 9 indicates a situation in which the left wrist WR of the user U1 wearing the information processing device 100 is rotated (outward rotation) in the outward direction (second direction).

For example, the information processing device 100 may use the rotation of the wrist of the user for moving the focus upward and downward as illustrated in content CT11 and CT12. For example, as illustrated in the content CT11, in a case where the wrist WR of the user U1 is rotated in the first direction, the information processing device 100 moves the focus upward. For example, as illustrated in the content CT12, in a case where the wrist WR of the user U1 is rotated in the second direction, the information processing device 100 moves the focus downward.

For example, as illustrated in the content CT21 and CT22, the information processing device 100 may use the rotation of the wrist of the user for a UI of level adjustment such as a knob or a slider. For example, as illustrated in the content CT21, in a case where the wrist WR of the user U1 is rotated in the first direction, the information processing device 100 adjusts the level in a direction of lowering the level. For example, as illustrated in the content CT22, in a case where the wrist WR of the user U1 is rotated in the second direction, the information processing device 100 adjusts the level in a direction of raising the level.

Furthermore, for example, the information processing device 100 may use the rotation for size adjustment such as enlargement and reduction of an image as illustrated in the content CT31 and CT32. For example, as illustrated in the content CT31, in a case where the wrist WR of the user U1 is rotated in the first direction, the information processing device 100 adjusts the display size in such a manner as to reduce the image. For example, as illustrated in the content CT32, in a case where the wrist WR of the user U1 is rotated in the second direction, the information processing device 100 adjusts the display size in such a manner as to enlarge the image.

Note that the information processing device 100 may use the rotation of the wrist for purposes other than changing the display mode. For example, the information processing device 100 may use the rotation of the wrist for level adjustment without any GUI. For example, in a case where the wrist WR of the user U1 is rotated in the first direction, the information processing device 100 adjusts the level in a direction of lowering the output volume of the content. For example, in a case where the wrist WR of the user U1 is rotated in the second direction, the information processing device 100 adjusts the level in a direction of raising the output volume of the content.

As described above, in a case where the rotation of the wrist of the user is in the first direction, the information processing device 100 changes to one side of the one dimension corresponding to the content, and in a case where the rotation of the wrist of the user is in the second direction, the information processing device 100 changes to the other side of the one dimension corresponding to the content.

[1-4-4. Detailed Example of Procedure of Information Processing]

Figure 10:
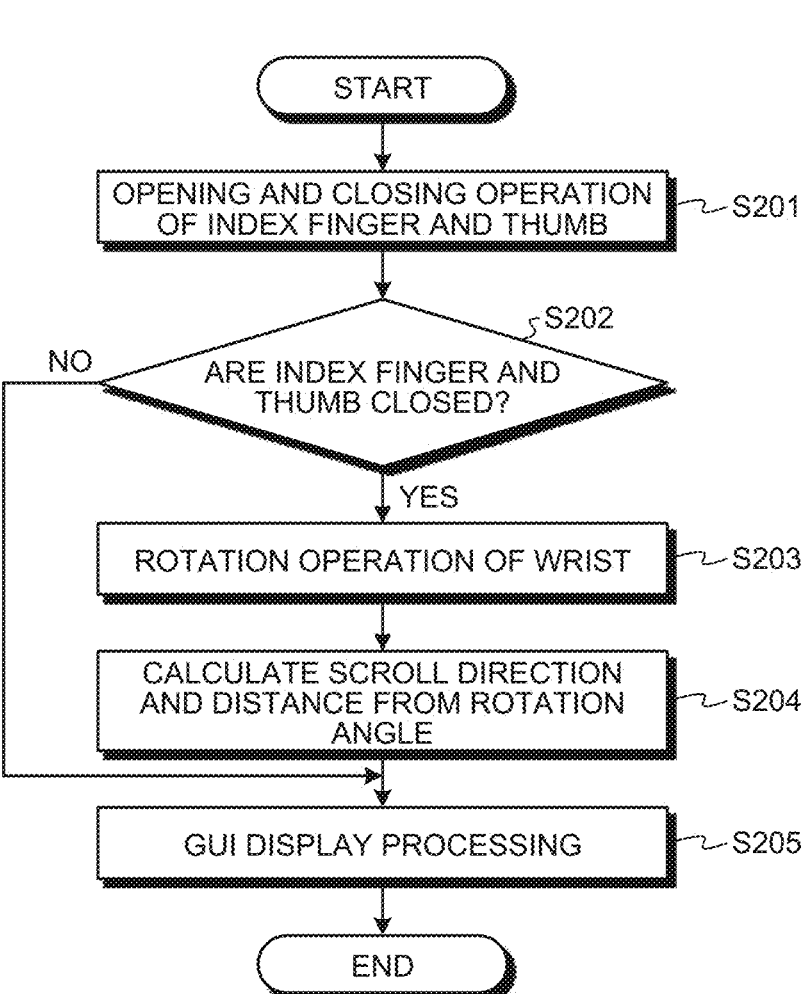
FIG. 10 is a flowchart illustrating an example of a detailed procedure of the information processing.

Next, a detailed example of the information processing according to the embodiment of the present disclosure will be described with reference to FIG. 10. FIG. 10 is a flowchart illustrating an example of a detailed procedure of the information processing. Specifically, FIG. 10 is a flowchart illustrating an example of a procedure of an operation by the shape of the fingers.

As illustrated in FIG. 10, the user who uses the information processing device 100 performs an opening and closing operation of the index finger and the thumb (Step S201). For example, the user wearing the information processing device 100, which is a display device, on the wrist performs an opening and closing operation of the index finger and the thumb by bringing the tip of the index finger into contact with the tip of the thumb or separating them. As a result, the information processing device 100 detects an opening and closing operation of the index finger and the thumb of the user.

Then, the information processing device 100 evaluates whether the index finger and the thumb are closed (Step S202). For example, the information processing device 100, which is a display device worn on the wrist of the user, determines whether or not the user is performing a predetermined gesture (for example, an OK sign) by evaluating whether or not the user is bringing the tip of the index finger and the tip of the thumb into contact with each other. In this manner, the information processing device 100 evaluates whether or not the user is making the predetermined shape of the fingers.

In a case where the index finger and the thumb are closed (Step S202: Yes), the information processing device 100 accepts the rotation of the wrist of the user as an operation (Step S203). For example, the user wearing the information processing device 100, which is the display device, on the wrist rotates the wrist in order to change the output mode of the content. As a result, the information processing device 100 accepts the rotation of the wrist of the user as an operation of changing the output mode of the content.

The information processing device 100 calculates the scroll direction and the distance from the rotation angle (Step S204). For example, the information processing device 100 determines the change mode from the direction in which the rotation angle is formed and determines the change amount from the magnitude of the rotation angle. Then, the information processing device 100 executes GUI display processing (Step S205). For example, the information processing device 100, which is a display device worn on the wrist of the user, changes the display of the content depending on the display mode that has been determined.

On the other hand, if the index finger and the thumb are not closed (Step S202: No), the information processing device 100 performs the processing of Step S205 without performing the processing of Steps S203 to S204. For example, the information processing device 100, which is a display device worn on the wrist of the user, maintains the display without changing the display mode regardless of presence or absence of a rotation operation of the wrist of the user.

[1-4-5. Another Example of Information Processing]

Figure 11:
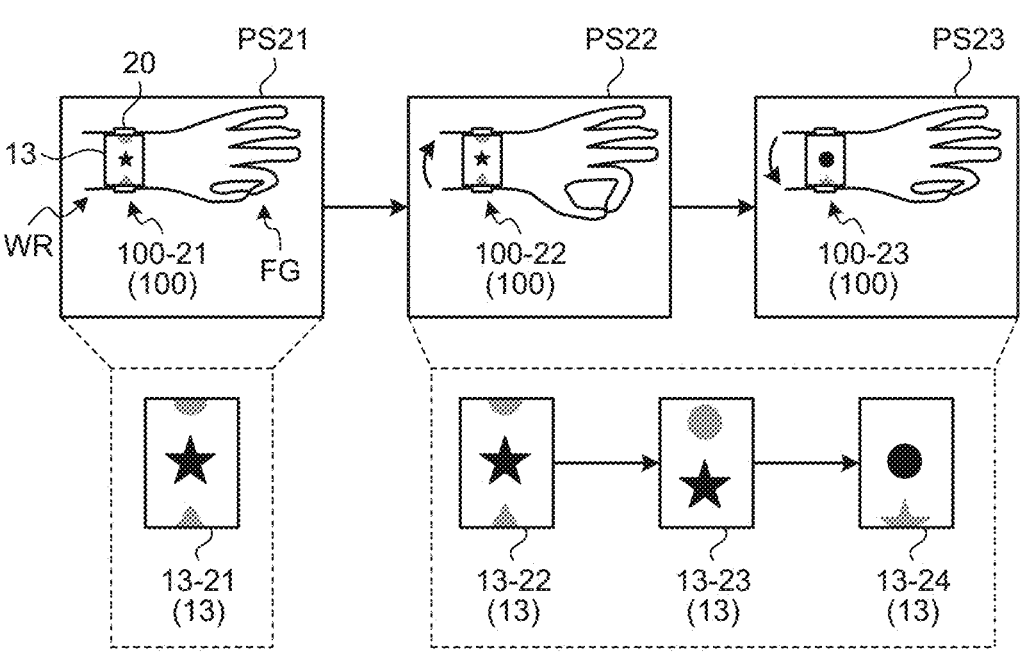
FIG. 11 is a diagram illustrating an example of another piece of information processing.
Figure 12:
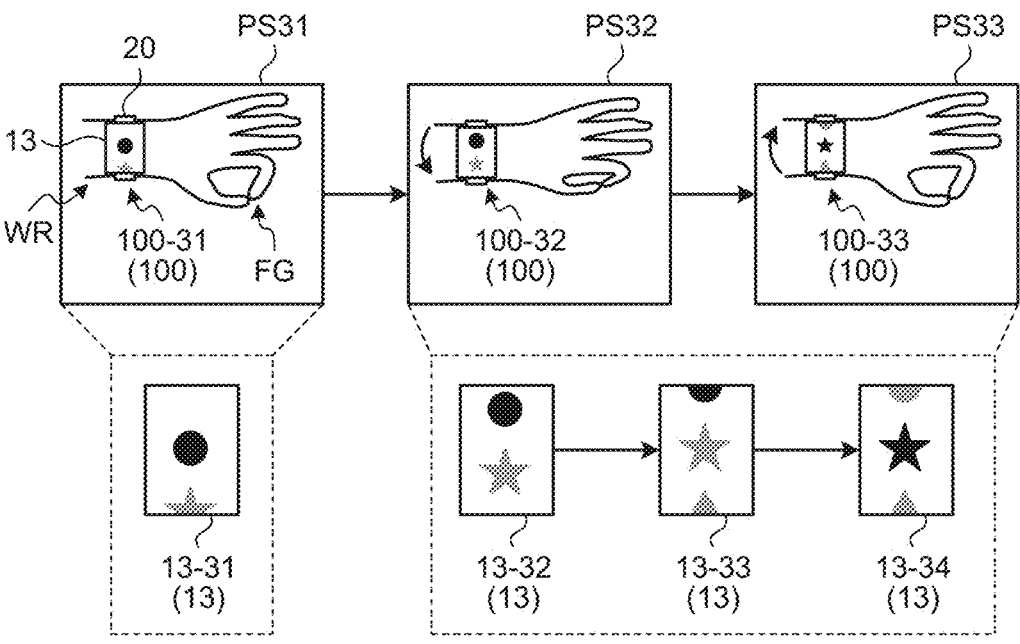
FIG. 12 is a diagram illustrating an example of another piece of information processing.

Note that the above-described rotational motion of the wrist of the user is merely an example, and the information processing device 100 may use various rotational motions of the wrist of the user to change the output mode of the content. An example will be described for this point with reference to FIGS. 11 and 12. FIGS. 11 and 12 are diagrams illustrating an example of other information processing. Note that description of points similar to the content described in FIG. 2 and others will be omitted as appropriate.

First, an example of a case where the display area of the content is moved upward depending on the rotation of the wrist WR of the user U1 will be described with reference to FIG. 11. Note that, in FIG. 11, information processing devices 100-21 to 100-23 are illustrated for corresponding processing situations PS21 to PS23; however, these are the same information processing device 100 worn on the wrist WR of the user U1 and are described as the information processing device 100 when description is given without particularly distinguishing them. In addition, in FIG. 11, for simplification of illustration, the reference signs of the display unit 13, the band unit 20, the fingers FG, and the wrist WR are indicated only in the processing situation PS21. Furthermore, in FIG. 11, display units 13-21 to 13-24 are illustrated corresponding to display modes; however, they are the display unit 13 of the same information processing device 100 and will be referred to as the display unit 13 when description is given without particularly distinguishing them.

First, the situation PS21 which is a first processing situation illustrated in FIG. 11 indicates a state, in which the user U1 brings the tip of the index finger and the tip of the thumb into contact with each other and the index finger and the thumb of the user U1 are closed, and the information processing device 100-21 in this situation. The situation PS21 indicates a situation before the rotation of the wrist WR of the user U1. The display unit 13-21 indicates a display mode of the content in the situation PS21. The display unit 13-21 displays a part of the circular figure at the upper portion in the up-down direction, the star-shaped figure at the center, and a part of the rhomboid figure at the lower portion.

The situation PS22 which is a second processing situation illustrated in FIG. 11 illustrates a situation, in which the wrist WR of the user U1 starts to be rotated in the second direction in the state where the index finger and the thumb of the user U1 are closed, and the information processing device 100-22 in this situation. For example, the situation PS22 indicates a situation in which the left wrist WR of the user U1 is rotated (outward rotation) in the outward direction (second direction). The display mode of the display unit 13-22 corresponding to the display unit 13 in the information processing device 100-22 is similar to the display mode of the display unit 13-21.

The situation PS23 which is a third processing situation illustrated in FIG. 11 illustrates a situation after the wrist WR of the user U1 has been rotated in the first direction in the state where the index finger and the thumb of the user U1 are closed, and the information processing device 100-23 in this situation. For example, the situation PS23 indicates a situation in which the left wrist WR of the user U1 is rotated outward (in the second direction) (outward rotation) in the situation PS22 and then immediately the left wrist WR of user U1 is rotated inward (in the first direction) (inward rotation). That is, the situation PS22 to the situation PS23 indicate a motion in which the user U1 lightly turns the wrist WR and turns it back. Specifically, the situation PS22 to the situation PS23 indicate a motion (hereinafter, also referred to as "outward-inward motion") of rotating the wrist WR in the first direction immediately after the user U1 lightly rotates the wrist WR in the second direction to return the wrist WR to the state before rotating the wrist WR in the second direction.

In a case where the user U1 performs the outward-inward motion in the state where the index finger and the thumb of the user U1 are closed, the information processing device 100 evaluates that the state of the fingers FG of the user U1 satisfies the condition and determines to change the output mode of the content corresponding to the outward-inward motion of the user U1. That is, the information processing device 100 changes the display mode of the display unit 13 depending on the outward-inward motion of the user U1 illustrated in the situation PS22 to the situation PS23. The information processing device 100 determines to move the display area of the content upward depending on the outward-inward motion of the user U1. The information processing device 100 displays, on the display unit 13, the display area of the content moved upward depending on the outward-inward motion of the user U1.

In the example of FIG. 11, the information processing device 100 changes the figure being selected (focused) to a figure one figure above the figure being selected depending on the outward-inward motion of the user U1. Specifically, the information processing device 100 changes the figure being selected (focused) from the star-shaped figure to the circular figure located above the star-shaped figure depending on the outward-inward motion of the user U1. Then, the information processing device 100 moves the display area of the content upward such that the circular figure, which is the selected figure, is positioned at the center. The information processing device 100 displays, on the display unit 13, the display area of the content moved upward such that the circular figure is located in the center.

The display mode of the display unit 13-24 corresponding to the display unit 13 in the information processing device 100-23 indicates the display mode of the display unit 13 after the outward-inward motion has been performed. The display unit 13-24 indicates a case where the display area of the content is moved such that the circular figure, which has been positioned at the upper portion of the display unit 13-21, is positioned at the center. The display unit 13-24 displays the circular figure at the center in the up-down direction and a part of the star-shaped figure at the lower portion. Note that the display unit 13-23 indicates an interim state of the display transition from the situation PS22 to the situation PS23 and indicates a state in which the display area of the content is being moved upward.

Next, an example of a case where the display area of the content is moved downward depending on the rotation of the wrist WR of the user U1 will be described with reference to FIG. 12. In FIG. 12, a case where the display mode of the display unit 13-24 of FIG. 11 is returned to the display mode of the display unit 13-21 of FIG. 11 will be described as an example; however, processing of moving the display area of the content downward is not limited to that in FIG. 12. For example, the processing of changing the display area of the content downward depending on the rotation of the wrist WR of the user U1 may be processing of moving the display area of the content downward from the display mode of the display unit 13-21 in FIG. 11.

Note that, in FIG. 12, information processing devices 100-31 to 100-33 are illustrated for corresponding processing situations PS31 to PS33; however, these are the same information processing device 100 worn on the wrist WR of the user U1 and are described as the information processing device 100 when description is given without particularly distinguishing them. In addition, in FIG. 12, for simplification of illustration, the reference signs of the display unit 13, the band unit 20, the fingers FG, and the wrist WR are indicated only in the processing situation PS31. Furthermore, in FIG. 12, display units 13-31 to 13-34 are illustrated corresponding to display modes; however, they are the display unit 13 of the same information processing device 100 and will be referred to as the display unit 13 when description is given without particularly distinguishing them.

First, the situation PS31 which is a first processing situation illustrated in FIG. 12 indicates a state, in which the user U1 brings the tip of the index finger and the tip of the thumb into contact with each other and the index finger and the thumb of the user U1 are closed, and the information processing device 100-31 in this situation. The situation PS31 indicates a situation before the rotation of the wrist WR of the user U1. The display unit 13-31 indicates a display mode of the content in the situation PS31. The display unit 13-31 displays the circular figure at the center in the up-down direction and a part of the star-shaped figure at the lower portion. The display mode of the display unit 13-31 corresponding to the display unit 13 in the information processing device 100-31 is similar to the display mode of the display unit 13-24 in FIG. 11.

The situation PS32 which is a second processing situation illustrated in FIG. 12 illustrates a situation in which the wrist WR of the user U1 is rotated in the first direction in the state where the index finger and the thumb of the user U1 are closed, and the information processing device 100-32 in this situation. For example, the situation PS32 indicates a situation in which the left wrist WR of the user U1 is rotated (inward rotation) in the inward direction (first direction). The display mode of the display unit 13 before the rotation of the wrist WR of the user U1 in the first direction is started in the information processing device 100-32 is similar to the display mode of the display unit 13-31.

The situation PS33 which is a third processing situation illustrated in FIG. 12 illustrates a situation after the wrist WR of the user U1 has been rotated in the second direction in the state where the index finger and the thumb of the user U1 are closed, and the information processing device 100-33 in this situation. For example, the situation PS33 indicates a situation in which the left wrist WR of the user U1 is rotated inward (in the first direction) (inward rotation) in the situation PS32 and then immediately the left wrist WR of user U1 is rotated outward (in the second direction) (outward rotation). That is, the situation PS32 to the situation PS33 indicate a motion in which the user U1 lightly turns the wrist WR and turns it back. Specifically, the situation PS32 to the situation PS33 indicate a motion (hereinafter, also referred to as "inward-outward motion") of rotating the wrist WR in the second direction immediately after the user U1 lightly rotates the wrist WR in the first direction to return the wrist WR to the state before rotating the wrist WR in the first direction.

In a case where the user U1 performs the inward-outward motion in the state where the index finger and the thumb of the user U1 are closed, the information processing device 100 evaluates that the state of the fingers FG of the user U1 satisfies the condition and determines to change the output mode of the content corresponding to the inward-outward motion of the user U1. That is, the information processing device 100 changes the display mode of the display unit 13 depending on the inward-outward motion of the user U1 illustrated in the situation PS32 to the situation PS33. The information processing device 100 determines to move the display area of the content downward depending on the inward-outward motion of the user U1. The information processing device 100 displays, on the display unit 13, the display area of the content moved downward depending on the inward-outward motion of the user U1.

In the example of FIG. 12, the information processing device 100 changes the figure being selected (focused) to a figure one figure below the figure being selected depending on the inward-outward motion of the user U1. Specifically, the information processing device 100 changes the figure being selected (focused) from the circular figure to the star-shaped figure located below the circular figure depending on the inward-outward motion of the user U1. Then, the information processing device 100 moves the display area of the content downward such that the star-shaped figure, which is the selected figure, is positioned at the center. The information processing device 100 displays, on the display unit 13, the display area of the content moved downward such that the star-shaped figure is located in the center.

The display mode of the display unit 13-34 corresponding to the display unit 13 in the information processing device 100-33 indicates the display mode of the display unit 13 after the inward-outward motion has been performed. The display unit 13-34 indicates a case where the display area of the content is moved such that the star-shaped figure, which has been positioned at the lower portion of the display unit 13-31, is positioned at the center. The display unit 13-34 displays a part of the circular figure at the upper portion in the up-down direction, the star-shaped figure at the center, and a part of the rhomboid figure at the lower portion. Note that the display units 13-32 and 13-33 indicate an interim state of the display transition from the situation PS32 to the situation PS33 and indicates a state in which the display area of the content is being moved downward. For example, the display unit 13-32 indicates a display mode in which the display area of the content is being moved downward, and the display unit 13-33 indicates the display mode before the focus is moved to the star-shaped figure.

In the processing illustrated in FIGS. 11 and 12, in the GUI of the menu list displayed on the display unit 13 which is the screen display unit of the information processing device 100 as the wristband device, in a case where the user wants to scroll menu items of the GUI frame by frame, the user can scroll only one frame in a corresponding direction by a gesture of turning the wrist in any direction and immediately turning the wrist back in the opposite direction while keeping the posture of pinching with the fingers. For example, in the case of the left hand operation, in the information processing device 100, when the palm is turned from a state of facing downward to a state of facing upward while being in the posture of pinching with the fingers and then immediately returned in the opposite direction while being in the posture of pinching with the fingers, the GUI menu flows from the bottom to the top. Furthermore, for example, in the information processing device 100, in the state where the index finger and the thumb are opened, the GUI is not scrolled even when the wrist is turned.

[1-4-6. Another Operation Example]

Note that the above-described operation is merely an example, and the operation using the rotation of the wrist of the user is not limited to the above operation and may vary. For example, the information processing device 100 may use the rotation of the wrist of the user for an operation of shuffling (random) playback of content. For example, the user using the information processing device 100 may start the shuffle playback by vigorously performing the rotational motion of the wrist in alternate directions while pinching with the fingers in a state where a list of songs or the like is displayed.

2. OTHER EMBODIMENTS

The processing according to the above embodiments may be performed in various different modes (modifications) other than in the above embodiments. For example, the system configuration is not limited to the above-described example and may be in various modes. This point will be described below. Note that, hereinafter, description of a similar points to that of the information processing device 100 according to the embodiment will be omitted as appropriate.

[2-1. Other Examples of Device Structure]

For example, the physical device configuration (structure) of the information processing device 100 described above is merely an example, and various device configurations can be adopted as the information processing device 100. Hereinafter, other structure examples other than the above-described structure will be described.

2-1-1. First Structure Example

Figure 13:
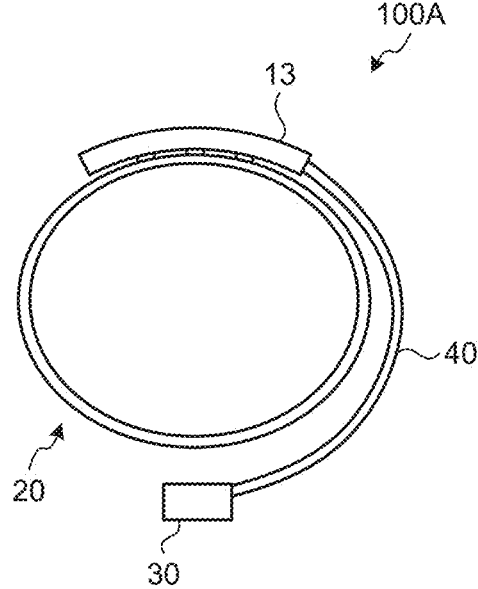
FIG. 13 is a diagram illustrating another structure example of the information processing device.
Figure 14:
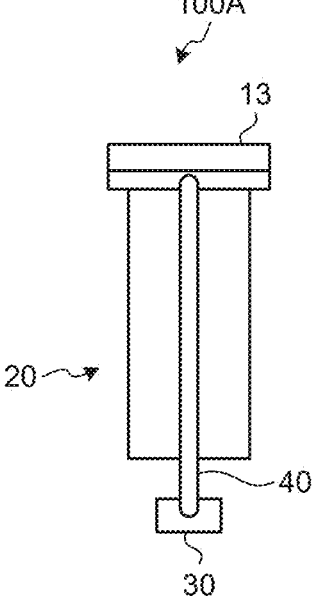
FIG. 14 is a diagram illustrating another structure example of the information processing device.

First, a first structure example, which is another structure example other than the above-described structure, will be described with reference to FIGS. 13 and 14. FIGS. 13 and 14 are diagrams illustrating the other structure example of the information processing device. Illustrated in FIGS. 13 and 14 is an exemplary structure for holding the position of a display unit. For example, FIG. 13 is a front view of an information processing device 100A of the first structure example. For example, FIG. 14 is a side view of the information processing device 100A viewed from a connection unit 40 side of the information processing device 100A of the first structure example.

The information processing device 100A of the first structure example is a type in which a display unit 13 is movable. For example, in the information processing device 100A of the first structure example, a band unit 20 does not slide with respect to the rotation of the wrist, and the display unit 13 (display) slides along the band unit 20 to move. For example, in the information processing device 100A of the first structure example, a weight 30 is provided on the opposite side of the display unit 13 so that the display unit 13 faces in the same direction. For example, in the information processing device 100A of the first structure example, the weight 30 is provided at a position facing the display unit 13 across the center of the band unit 20.

As illustrated in FIG. 13, when worn on the wrist of a user, the band unit 20 of the information processing device 100A comes into contact with the wrist of the user and rotates in the circumferential direction of the wrist together with the wrist of the user. The band unit 20 of the information processing device 100A is disposed between the wrist of the user and the display unit 13 when worn on the wrist of the user.

In the information processing device 100A, the display unit 13 and the weight 30 are connected by a connection unit 40. As a result, the display unit 13 rotates together with the weight 30 along the circumferential direction of the band unit 20.

[2-1-2. Second Structure Example]

Figure 15:
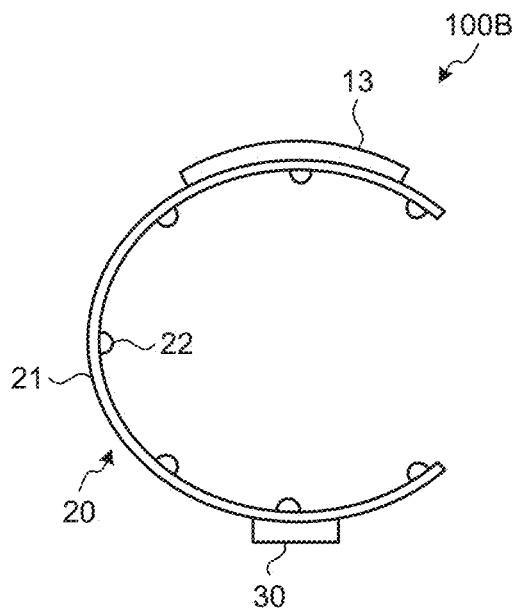
FIG. 15 is a diagram illustrating another structure example of the information processing device.
Figure 16:
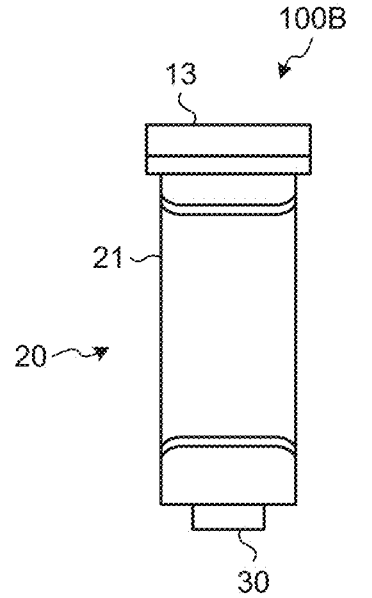
FIG. 16 is a diagram illustrating another structure example of the information processing device.

Next, a second structure example, which is another structure example other than the above-described structures, will be described with reference to FIGS. 15 and 16. FIGS. 15 and 16 are diagrams illustrating the other structure example of the information processing device. Illustrated in FIGS. 15 and 16 is a structure example in which the display unit follows the rotation of the wrist. For example, FIG. 15 is a front view of an information processing device 100B of the second structure example. For example, FIG. 16 is a side view of the information processing device 100B viewed from a side of a cut portion of a band unit 20 of the information processing device 100B of the second structure example.

The information processing device 100B of the second structure example has a structure in which the band unit 20 does not extend around the entire circumference. For example, in the information processing device 100B, the display unit 13 rotates together with the band unit 20 with respect to the rotation of the wrist. For example, the band unit 20 of the information processing device 100B is partially cut out in the circumferential direction and not for the entire circumference. For example, the band unit 20 of the information processing device 100B is a bracelet or the like formed of a material having elasticity (such as rubber), and the information processing device 100B can be easily attached to and detached from the wrist (arm) of the user.

[2-1-3. Third Structure Example]

Figure 17:
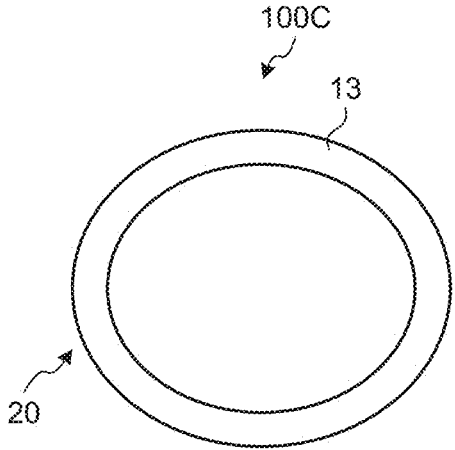
FIG. 17 is a diagram illustrating another structure example of the information processing device.
Figure 18:
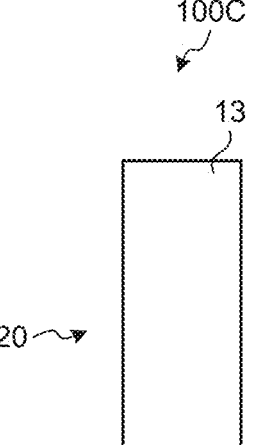
FIG. 18 is a diagram illustrating another structure example of the information processing device.

Next, a third structure example, which is another structure example other than the above-described structures, will be described with reference to FIGS. 17 and 18. FIGS. 17 and 18 are diagrams illustrating the other structure example of the information processing device. FIGS. 17 and 18 are diagrams illustrating a structure example in which a display unit follows the rotation of the wrist. For example, FIG. 17 is a front view of an information processing device 100C of the third structure example. For example, FIG. 18 is a side view of the information processing device 100C of the third structure example.

The information processing device 100C of the third structure example has structure in which a display is installed over the entire circumference. In the information processing device 100C of the third structure example, a display unit 13 is disposed over the entire circumference along the outer circumference of a band unit 20. Note that, in the information processing device 100C, the band unit 20 and the display unit 13 may be integrated. For example, in the information processing device 100C, the display unit 13 (display) may have the function of the band unit 20.

[2-1-4. Fourth Structure Example]

Figure 19:
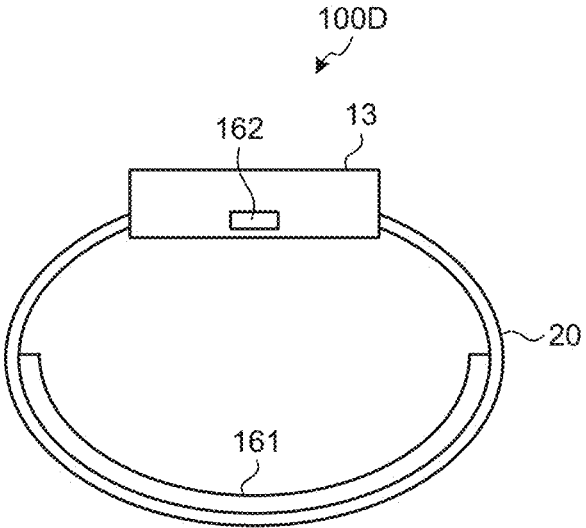
FIG. 19 is a diagram illustrating another structure example of the information processing device.

Next, a fourth structure example, which is another structure example other than the above-described structures, will be described with reference to FIG. 19. FIG. 19 is a diagram illustrating another structure example of the information processing device. FIG. 19 is a diagram illustrating a structure example in which a display unit follows the rotation of the wrist. For example, FIG. 19 is a front view of an information processing device 100D of the fourth structure example.

The information processing device 100D of the fourth structure example is a wristband-type device. The information processing device 100D is mounted with a gyro sensor as the second sensor 162 and detects (senses) a rotational motion (motion) of the wrist. As the first sensor 161, the information processing device 100D is mounted with a myoelectric sensor on a band unit 20 and detects whether the index finger and the thumb are opened or the index finger and the thumb are closed. Note that the open or closed state of the fingers may be detected by a camera (sensor) instead of the myoelectric sensor. The information processing device 100D may also detect whether the hand is in an open state or a closed state.

Figure 20:
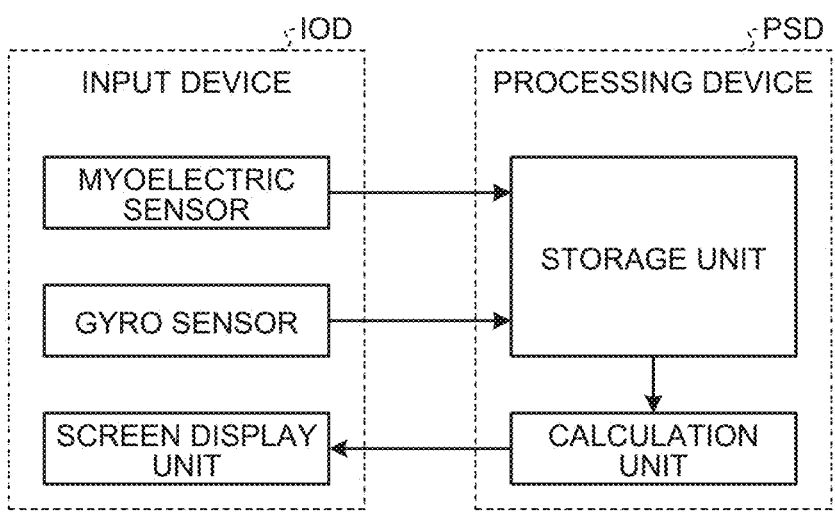
FIG. 20 is a diagram illustrating an example of a device configuration.

Here, an example of the above-described device configuration will be described with reference to FIG. 20. FIG. 20 is a diagram illustrating an example of a device configuration. For example, FIG. 20 is a diagram illustrating an example of a device configuration in a case where the display unit follows the rotation of the wrist. Hereinafter, the information processing device 100D will be described as an example of a display device in a case where the display unit follows the rotation of the wrist. However, the display device is not limited to the information processing device 100D and may be any device as long as the display unit follows the rotation of the wrist.

The information processing device 100D includes the myoelectric sensor, the gyro sensor, and a screen display unit as an input device IOD. Furthermore, the information processing device 100D includes a storage unit and a calculation unit as a processing device PSD. For example, the myoelectric sensor illustrated in FIG. 20 corresponds to the first sensor 161. The gyro sensor illustrated in FIG. 20 corresponds to the second sensor 162. The screen display unit illustrated in FIG. 20 corresponds to the display unit 13. The storage unit illustrated in FIG. 20 corresponds to the storage unit 14. The calculation unit illustrated in FIG. 20 corresponds to the control unit 15.

[2-2. Other Application Examples]

Note that, in the above-described example, the wristband-type display device has been described as an example of the information processing device; however, the information processing device that is the display device is not limited to the wristband type and may be in various modes. Hereinafter, an example of this point will be described.

[2-2-1. Ring Type]

Figure 21:
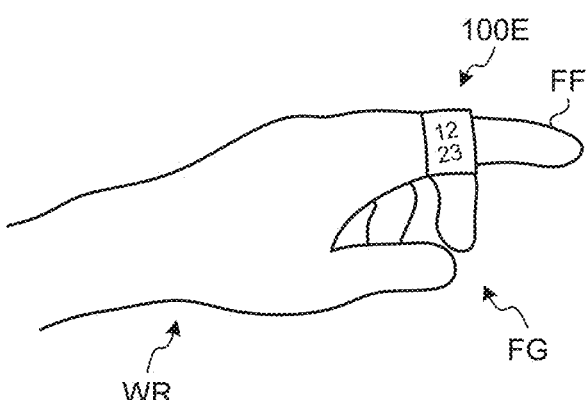
FIG. 21 is a diagram illustrating an example of application to a ring type.

For example, as illustrated in FIG. 21, the information processing device may be a ring-type information processing device 100E worn on a finger of a user. FIG. 21 is a diagram illustrating an example of application as a ring type. Specifically, FIG. 21 is a diagram illustrating an example of a ring-type information processing device (display device). Illustrated in FIG. 21 is a case where the information processing device 100E is worn on the index finger FF of a user U1. Note that the information processing device 100E may be worn on any fingers without being limited to the index finger of the user.

Figure 22:
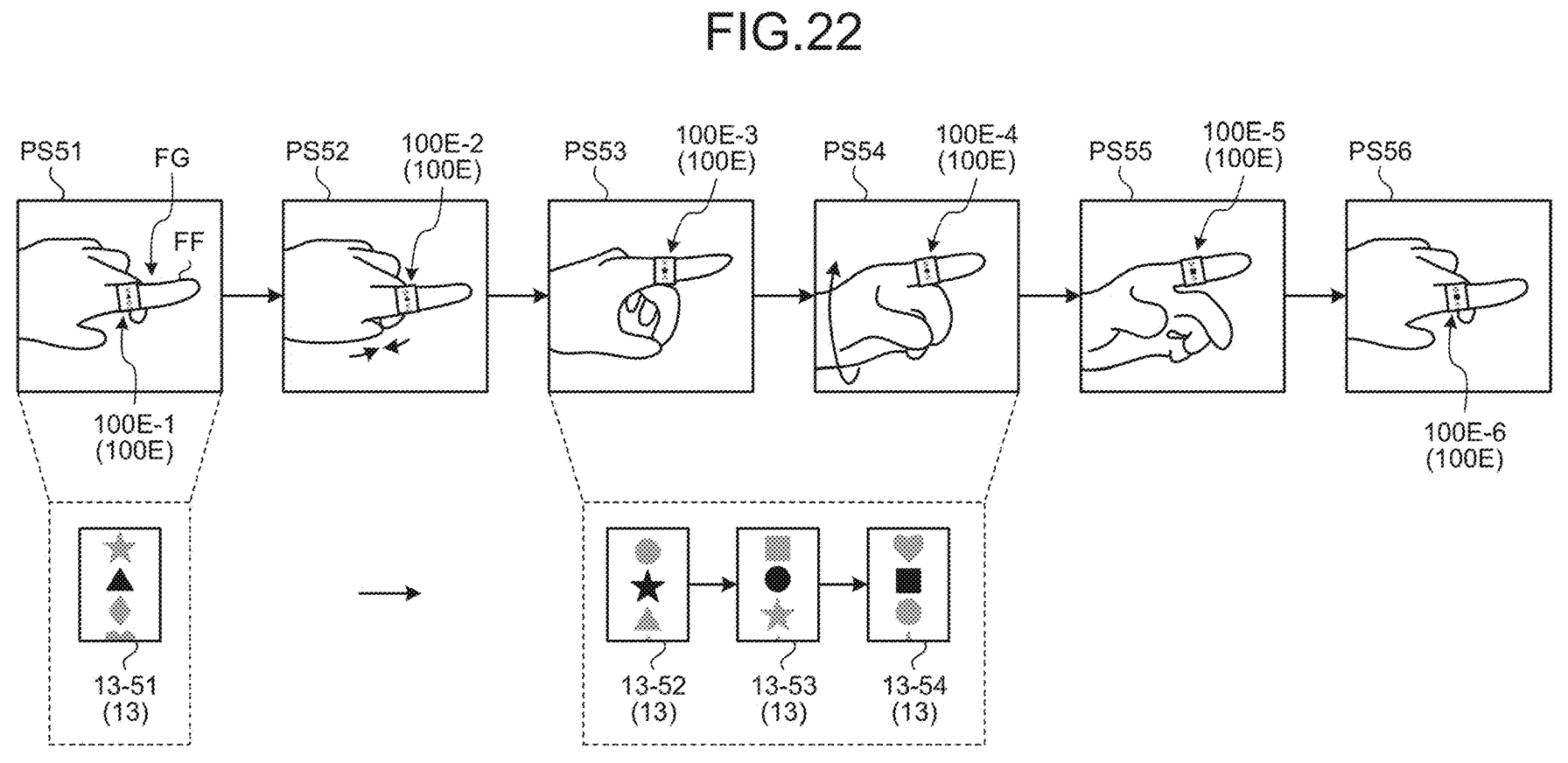

Hereinafter, an example of information processing in the information processing device 100E will be described with reference to FIG. 22. FIG. 22 is a diagram illustrating an example of information processing in the ring-type application example. Note that the operation method by gestures in the ring-type information processing device 100E is substantially the same as that in the case of the wristband type including moving options, the decision operation, and the like, and thus detailed description thereof is omitted as appropriate.

In FIG. 22, information processing devices 100E-1 to 100E-6 are illustrated for corresponding processing situations PS51 to PS56; however, these are the same information processing device 100E worn on the index finger FF of the user U1 and are described as the information processing device 100E when description is given without particularly distinguishing them. In addition, in FIG. 22, for simplification of illustration, the reference signs of the display unit 13, the band unit 20, the fingers FG, and the index finger FF are indicated only in the processing situation PS51, the wrist WR is not illustrated in FIG. 22. Furthermore, in FIG. 22, display units 13-51 to 13-54 are illustrated corresponding to display modes; however, they are the display unit 13 of the same information processing device 100E and will be referred to as the display unit 13 when description is given without particularly distinguishing them.

Furthermore, in FIG. 22, in order to explain a change of a display mode, a case in which the content in which a plurality of figures such as a star-shaped figure, a triangular figure, a rhomboid figure, a circular figure, a rectangular figure, and a heart-shaped figure are arranged side by side in the up-down direction is displayed on the display unit 13 will be described as an example. In addition, in FIG. 22, illustrated is a case where a figure displayed at the center of the display unit 13 in the up-down direction is selected (designated). Note that, in FIG. 22, the figure displayed at the center that has been selected (designated) is illustrated in a deeper color than the other figures, thereby making that the figure displayed at the center to be focused and indicating that the figure has been selected (designated).

Furthermore, in FIG. 22, a case where the condition for accepting a change of the output mode of the content is a state in which the tip of the middle finger and the tip of the thumb of the user are in contact with each other will be described as an example. That is, illustrated in FIG. 22 is a case where the information processing device 100E determines to accept a change of the display of the content by the rotation of the wrist WR of the user U1 in a case where the fingers FG of the user U1 is a state in which a space between the middle finger and the thumb is closed. Note that the fingers used for the gesture is not limited to the middle finger and may be other fingers such as the pointing finger or the third finger.

First, the situation PS51 which is a first processing situation illustrated in FIG. 22 indicates a state in which the middle finger and the thumb of the user U1 are not closed and the information processing device 100E-1 in this situation. The display unit 13-51 indicates a display mode of the content in the situation PS51. The display mode of the display unit 13-51 is similar to the display mode of the display unit 13-1 in FIG. 2.

The situation PS52 which is a second processing situation illustrated in FIG. 22 indicates a state, in which the user U1 brings the tip of the middle finger and the tip of the thumb into contact with each other and the middle finger and the thumb of the user U1 are closed, and the information processing device 100E-2 in this situation. For example, the situation PS52 indicates a situation in which the user U1 performs a motion of pinching with fingers FG. Note that the situation PS52 indicates the situation before the rotation of the wrist WR of the user U1, and the display mode of the display unit 13 in the information processing device 100E-2 is similar to the display mode of the display unit 13-51.

The situation PS53 and the situation PS54 which are a third processing situation illustrated in FIG. 22 illustrates a situation, in which the wrist WR of the user U1 is rotated in the state where the middle finger and the thumb of the user U1 are closed, and the information processing devices 100E-3 and 100E-4 in this situation. For example, the situations PS53 and the situation PS54 indicate a situation in which the user U1 performs the motion of turning the wrist WR. Specifically, the situation PS53 and the situation PS54 indicate a situation in which the left wrist WR of the user U1 is rotated (outward rotation) in the outward direction (second direction).

In a case where the user U1 rotates the wrist WR in the state where the middle finger and the thumb of the user U1 are closed, the information processing device 100E evaluates that the state of the fingers FG of the user U1 satisfies the condition and determines to change the output mode of the content corresponding to the rotation of the wrist WR of the user U1.

The display units 13-52 to 13-54 indicate changes in the display mode of the content in the case where the wrist WR of the user U1 is rotated in the second direction, which are similar to those in FIG. 2, and thus detailed description is omitted. The display mode of the display unit 13-52 is similar to the display mode of the display unit 13-2 in FIG. 2. The display mode of the display unit 13-53 is similar to the display mode of the display unit 13-3 in FIG. 2. The display mode of the display unit 13-54 is similar to the display mode of the display unit 13-4 in FIG. 2.

The situation PS55 which is a fourth processing situation illustrated in FIG. 22 indicates a state, in which the user U1 separates the tip of the middle finger and the tip of the thumb from each other and the middle finger and the thumb of the user U1 are not closed, and the information processing device 100E-5 in this situation. For example, the situation PS55 indicates a situation in which the user U1 performs a motion of releasing the pinching fingers FG.

The situation PS56 which is a fifth processing situation illustrated in FIG. 22 illustrates a situation, in which the wrist WR of the user U1 is rotated in a state where the middle finger and the thumb of the user U1 are not closed, and the information processing device 100E-6 in this situation. For example, the situation PS56 indicates a situation in which the user U1 turns the wrist WR backward and returns to the situation PS51. Specifically, the situation PS56 indicates a situation in which the left wrist WR of the user U1 is rotated (inward rotation) in the inward direction (first direction).

In a case where the user U1 rotates the wrist WR in the state where the middle finger and the thumb of the user U1 are closed, the information processing device 100E evaluates that the state of the fingers FG of the user U1 does not satisfy the condition and determines not to change the output mode of the content corresponding to the rotation of the wrist WR of the user U1. That is, the information processing device 100E maintains the display mode of the display unit 13-54 even in a case where the user U1 rotates the wrist WR in the situation PS56. Note that the information processing device 100E determines to move the display area of the content downward in a case where the wrist WR of the user U1 is rotated in the first direction in the state where the middle finger and the thumb of the user U1 are closed. In this case, the information processing device 100E displays, on the display unit 13, the display area of the content moved downward depending on the direction and the amount of rotation of the wrist WR of the user U1 in the first direction.

[2-2-2. Handle Grip Type]

Figure 23:
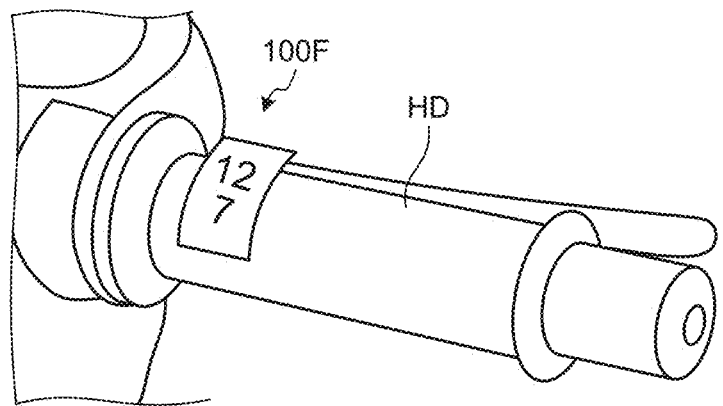
FIG. 23 is a diagram illustrating another application example.

For example, as illustrated in FIG. 23, the information processing device may be a handle grip-type information processing device 100F attached to a handle grip of a motorcycle. FIG. 23 is a diagram illustrating another application example. Specifically, FIG. 23 is a diagram illustrating an example of a handle grip-type information processing device (display device).

For example, the information processing device 100F accepts, as an operation of selective movement, a gesture (motion) of turning the handle grip in a gripping manner in which the user does not actually turn the handle grip. Furthermore, for example, the information processing device 100F accepts, as a determination operation, a motion in which the user grips the handle grip with a strong force for a moment.

[2-2-3. Pen Type]

Figure 24:
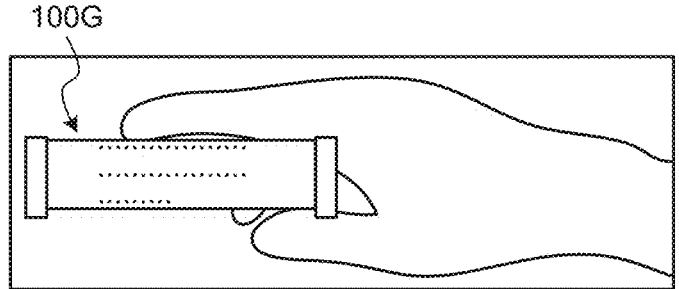
FIG. 24 is a diagram illustrating another application example.

For example, as illustrated in FIG. 24, the information processing device may be a pen-type information processing device 100G. FIG. 24 is a diagram illustrating another application example. Specifically, FIG. 24 is a diagram illustrating an example of a pen-type information processing device (display device).

For example, the information processing device 100G accepts, as an operation of selective movement, a motion in which a user turns the pen in an axial rotation direction of a cylinder. Furthermore, for example, the information processing device 100G accepts, as a determination operation, a motion in which the user presses a determination button.

The processing according to the above embodiments or modifications may be performed in various different modes (modifications) other than in the above embodiments or modifications. For example, the information processing device may have any device configuration as long as the above-described information processing can be implemented.

[2-3. Others]

Among the processing described in the above embodiments, the whole or a part of the processing described as that performed automatically can be performed manually, or the whole or a part of the processing described as that performed manually can be performed automatically by a known method. In addition, a processing procedure, a specific name, and information including various types of data or parameters illustrated in the above or in the drawings can be modified as desired unless otherwise specified. For example, various types of information illustrated in the figures are not limited to the information that has been illustrated.

In addition, each component of each device illustrated in the drawings is functionally conceptual and does not need to be necessarily physically configured as illustrated in the drawings. That is, a specific form of distribution and integration of each device is not limited to those illustrated in the figures, and all or a part thereof can be functionally or physically distributed or integrated in any unit depending on various loads, usage status, and the like.

In addition, the above embodiments and modifications can be combined as appropriate within a range where there is no conflict in the processing content.

Furthermore, the effects described herein are merely examples and are not limiting, and other effects may be achieved.

3. EFFECTS OF PRESENT DISCLOSURE

As described above, the information processing device (information processing devices 100 and 100A to 100G in the embodiment) according to the present disclosure includes an acquisition unit (acquisition unit 151 in the embodiment) and a determination unit (determination unit 153 in the embodiment). The acquisition unit acquires the first information indicating the state of fingers of a user and the second information indicating rotation of a wrist of the user. The determination unit determines the output mode of the content output from the device on the basis of the state of the fingers of the user indicated by the first information and the rotation of the wrist of the user indicated by the second information.

As a result, the information processing device according to the present disclosure can determine the output mode of the content output from the device on the basis of the state of the fingers of the user and the rotation of the wrist of the user indicated by the second information, whereby the output mode of the content can be determined using the two motions of the user, namely, the state of the fingers and the rotation of the wrist of the user. Therefore, the information processing device can appropriately provide the information output service depending on the motion of the user.

The determination unit also determines the display mode of the content displayed on the device, which is a display device, on the basis of the state of the fingers of the user and the rotation of the wrist of the user. As a result, the information processing device determines the display mode of the content by using the two motions of the user, namely, the state of the fingers of the user and the rotation of the wrist, whereby the information output service can be appropriately provided depending on the motion of the user.

Moreover, the determination unit determines whether or not to change the output mode of the content depending on the state of the fingers of the user and determines the amount of change in the output mode of the content by the rotation of the wrist of the user. As a result, the information processing device can determine the output mode of the content by using the two motions of the user by using each of the two motions of the state of the fingers of the user and the rotation of the wrist as information for different targets. Therefore, the information processing device can appropriately provide the information output service depending on the motion of the user.

In addition, the determination unit determines an amount corresponding to the amount of rotation of the wrist of the user as the change amount of the output mode of the content. As a result, the information processing device can appropriately provide the information output service depending on the motion of the user by using the amount corresponding to the amount of rotation of the wrist of the user as the change amount of the output mode of the content.

Furthermore, the determination unit determines to change to one side of one dimension corresponding to the content in a case where the rotation of the wrist of the user is in the first direction and to change to the other side of the one dimension corresponding to the content in a case where the rotation of the wrist of the user is in the second direction opposite to the first direction. As a result, the information processing device can appropriately provide the information output service depending on the motion of the user by determining the change mode depending on the direction of the rotation of the wrist of the user.

Furthermore, in a case where the one dimension corresponds to the output amount of the content, the determination unit determines to decrease the output amount of the content depending on the rotation of the wrist of the user in the first direction and to increase the output amount of content depending on the rotation of the wrist of the user in the second direction. As a result, the information processing device can appropriately provide the information output service depending on the motion of the user by using the rotation of the wrist of the user to determine the output amount of the content.

Furthermore, in a case where the one dimension corresponds to the display area of the content, the determination unit determines to decrease the display area of the content depending on the rotation of the wrist of the user in the first direction and to increase the display area of the content depending on the rotation of the wrist of the user in the second direction. As a result, the information processing device can appropriately provide the information output service depending on the motion of the user by using the rotation of the wrist of the user to determine the display area of the content.

Furthermore, in a case where the one dimension corresponds to the output volume of the content, the determination unit determines to decrease the output volume of the content depending on the rotation of the wrist of the user in the first direction and to increase the output volume of the content depending on the rotation of the wrist of the user in the second direction. As a result, the information processing device can appropriately provide the information output service depending on the motion of the user by using the rotation of the wrist of the user to determine the output volume of the content.

Furthermore, in a case where the one dimension corresponds to the up-down direction of the content, the determination unit determines to move the display area of the content downward depending on the rotation of the wrist of the user in the first direction and to move the display area of the content upward depending on the rotation of the wrist of the user in the second direction. As a result, the information processing device can appropriately provide the information output service depending on the motion of the user by using the rotation of the wrist of the user to determine the display area of the content in the up-down direction.

Furthermore, in a case where the state of the fingers of the user satisfies the condition, the determination unit determines to change the output mode of the content corresponding to the rotation of the wrist of the user. As a result, the information processing device can appropriately provide the information output service depending on the motion of the user by using the state of the fingers of the user to determine whether or not a change can be made.

Furthermore, in a case where the state of the fingers of the user does not satisfy the condition, the determination unit determines not to change the output mode of the content corresponding to the rotation of the wrist of the user. As a result, the information processing device can appropriately provide the information output service depending on the motion of the user by using the state of the fingers of the user to determine whether or not a change can be made.

Furthermore, in a case where the state of the fingers of the user corresponds to the gesture corresponding to a change in the output of the content, the determination unit determines to change the output mode of the content corresponding to the rotation of the wrist of the user. As a result, the information processing device can appropriately provide the information output service depending on the motion of the user by determining whether or not to change the output of the content depending on whether or not the state of the fingers of the user corresponds to the predetermined gesture.

Furthermore, in a case where the state of the fingers of the user has a shape corresponding to a change in the output of the content, the determination unit determines to change the output mode of the content corresponding to the rotation of the wrist of the user. As a result, the information processing device can appropriately provide the information output service depending on the motion of the user by determining whether or not to change the output of the content depending on whether or not the state of the fingers of the user corresponds to the predetermined gesture.

The information processing device also includes an output unit (the display unit 13 and the sound output unit 17 in the embodiment). The output unit outputs the content in the output mode determined by the determination unit. As a result, the information processing device can output the content in the output mode determined by using the two motions of the user, namely, the state of the fingers of the user and the rotation of the wrist. Therefore, the information processing device can appropriately provide the information output service depending on the motion of the user.

As described above, the display device (in the embodiment, the information processing devices 100 and 100A to 100G) according to the present disclosure is a wristband-type display device worn on the wrist of the user and includes a display unit (the display unit 13 in the embodiment) and a holding unit (the weight 30 in the embodiment). The display unit is movable along the circumferential direction of the wrist of the user when worn on the wrist of the user. When the user rotates the wrist, the holding unit holds the position of the display unit in the circumferential direction of the wrist of the user at a holding position that is a position before the rotation of the wrist of the user.

As described above, in a case where the user rotates the wrist, the display device according to the present disclosure holds the position of the display unit in the circumferential direction of the wrist of the user, whereby it is possible to suppress the display unit (display) from moving to a position where it is difficult for the user to see due to the rotation of the wrist of the user. Therefore, the information processing device can appropriately provide the information output service depending on the motion of the user.

Meanwhile, the holding unit is a weight that is movable together with the display unit along the circumferential direction of the wrist of the user when worn on the wrist of the user. In a case where the user rotates the wrist about a direction intersecting the gravity direction, the display unit is held at the holding position since the holding unit is held at a position in the circumferential direction of the wrist of the user. As a result, the display device can suppress the display unit (display) from moving to a position where it is difficult for the user to see due to rotation of the wrist of the user. Therefore, the information processing device can appropriately provide the information output service depending on the motion of the user.

Furthermore, the holding unit is disposed at a position different from that of the display unit in the circumferential direction of the wrist of the user when worn on the wrist of the user. The display unit is held at the holding position corresponding to a difference from the holding unit in terms of position in the circumferential direction of the wrist of the user. As a result, the display device can suppress the display unit (display) from moving to a position where it is difficult for the user to see due to rotation of the wrist of the user. Therefore, the information processing device can appropriately provide the information output service depending on the motion of the user.

Incidentally, the display device includes a band unit (the band unit 20 in the embodiment). When worn on the wrist of the user, the band unit comes into contact with the wrist of the user and rotates in the circumferential direction of the wrist together with the wrist of the user. As a result, the display device can move the band unit in contact with the user together with the wrist. Therefore, the display device can suppress the influence on the tactile sense of the user due to the holding of the position of the display unit (display), thereby enabling appropriate provision of the information output service depending on the motion of the user.

Furthermore, the band unit is disposed between the wrist of the user and the display unit when worn on the wrist of the user. As a result, the display device can suppress the display unit (display) whose position is held from directly touching the user. Therefore, the display device can suppress the influence on the tactile sense of the user due to the holding of the position of the display unit (display), thereby enabling appropriate provision of the information output service depending on the motion of the user.

4. HARDWARE CONFIGURATION

Figure 25:
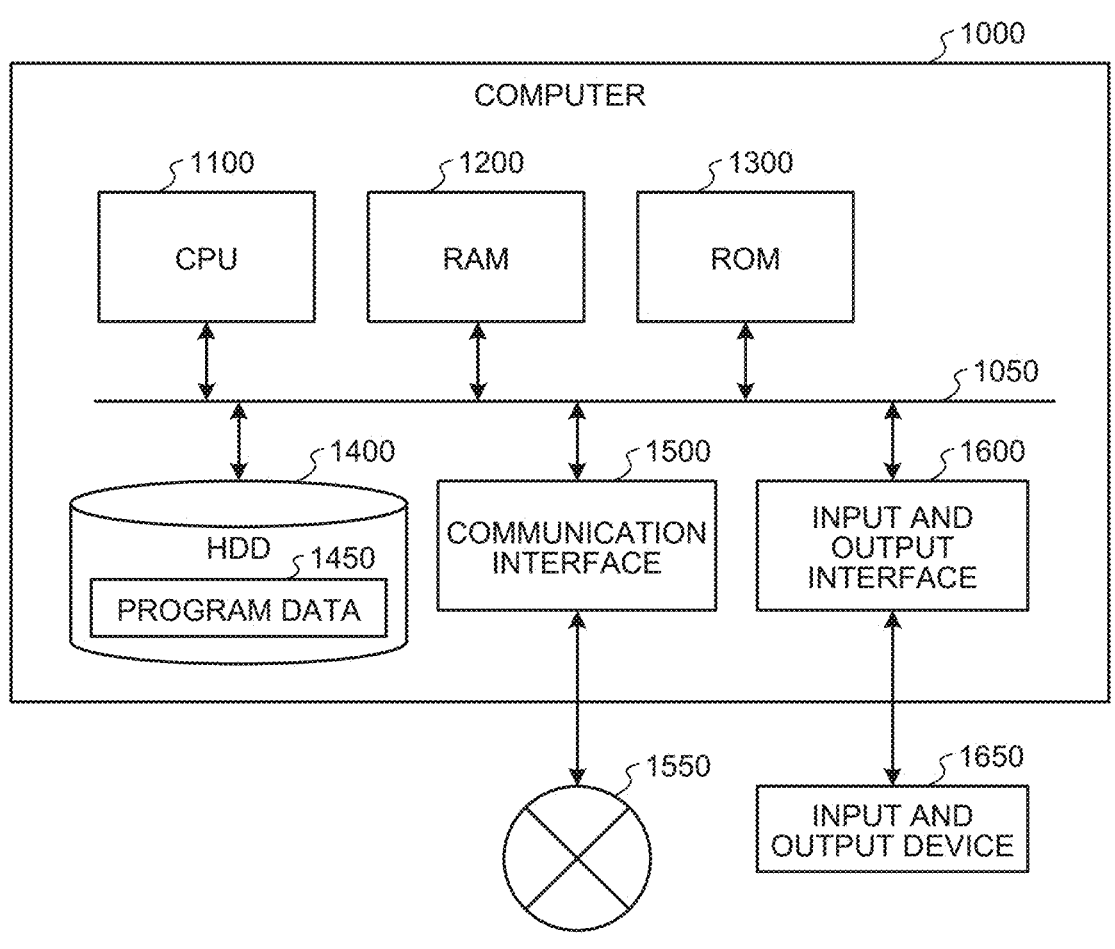
FIG. 25 is a hardware configuration diagram illustrating an example of a computer that implements functions of the information processing device.

Information appliances such as the information processing devices 100 and 100A to 100G according to the embodiments described above are implemented by, for example, a computer 1000 having a configuration as illustrated in FIG. 25. FIG. 25 is a hardware configuration diagram illustrating an example of the computer 1000 that implements functions of an information processing device such as the information processing devices 100 and 100A to 100G. Hereinafter, the information processing device 100 according to the embodiment will be described as an example. The computer 1000 includes a CPU 1100, a RAM 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads the program stored in the ROM 1300 or the HDD 1400 in the RAM 1200 and executes processing corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by such a program, and the like. Specifically, the HDD 1400 is a recording medium that records an information processing program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard or a mouse via the input and output interface 1600. The CPU 1100 also transmits data to an output device such as a display, a speaker, or a printer via the input and output interface 1600. Furthermore, the input and output interface 1600 may function as a media interface that reads a program or the like recorded in a predetermined recording medium. A medium refers to, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, in a case where the computer 1000 functions as the information processing device 100 according to the embodiment, the CPU 1100 of the computer 1000 implements the functions of the control unit 15 or other units by executing the information processing program loaded on the RAM 1200. The HDD 1400 also stores the information processing program according to the present disclosure or data in the storage unit 14. Note that although the CPU 1100 reads the program data 1450 from the HDD 1400 and executes the program data 1450, as another example, these programs may be acquired from another device via the external network 1550.

Note that the present technology can also have the following configurations.

(1)

An information processing device comprising:

an acquisition unit that acquires first information indicating a state of fingers of a user and second information indicating rotation of a wrist of the user; and a determination unit that determines an output mode of content output from a device on a basis of the state of the fingers of the user indicated by the first information and rotation of the wrist of the user indicated by the second information.

(2)

The information processing device according to (1), wherein the determination unit determines a display mode of the content displayed on the device on a basis of the state of the fingers of the user and rotation of the wrist of the user, the device being a display device.

(3)

The information processing device according to (1) or (2), wherein the determination unit determines whether or not to change the output mode of the content depending on the state of the fingers of the user and determines an amount of change in the output mode of the content by rotation of the wrist of the user.

(4)

The information processing device according to (3), wherein the determination unit determines an amount corresponding to an amount of rotation of the wrist of the user as the amount of change in the output mode of the content.

(5)

The information processing device according to (3) or (4), wherein the determination unit determines to change to one side of one dimension corresponding to the content in a case where the rotation of the wrist of the user is in a first direction and to change to the other side of the one dimension corresponding to the content in a case where the rotation of the wrist of the user is in a second direction opposite to the first direction.

(6)

The information processing device according to (5), wherein, in a case where the one dimension corresponds to the output amount of the content, the determination unit determines to decrease the output amount of the content depending on the rotation of the wrist of the user in the first direction and determines to increase the output amount of the content depending on the rotation of the wrist of the user in the second direction.

(7)

The information processing device according to (6), wherein, in a case where the one dimension corresponds to a display area of the content, the determination unit determines to decrease the display area of the content depending on the rotation of the wrist of the user in the first direction and determines to increase the display area of the content depending on the rotation of the wrist of the user in the second direction.

(8)

The information processing device according to (6), wherein, in a case where the one dimension corresponds to an output volume of the content, the determination unit determines to decrease the output volume of the content depending on the rotation of the wrist of the user in the first direction and determines to increase the output volume of the content depending on the rotation of the wrist of the user in the second direction.

(9)

The information processing device according to (5), wherein, in a case where the one dimension corresponds to an up-down direction of the content, the determination unit determines to move the display area of the content downward depending on the rotation of the wrist of the user in the first direction and determines to move the display area of the content upward depending on the rotation of the wrist of the user in the second direction.

(10)

The information processing device according to any one of (1) to (9), wherein the determination unit determines to change the output mode of the content corresponding to the rotation of the wrist of the user in a case where the state of the fingers of the user satisfies a condition.

(11)

The information processing device according to (10), wherein the determination unit determines not to change the output mode of the content corresponding to the rotation of the wrist of the user in a case where the state of the fingers of the user does not satisfy the condition.

(12)

The information processing device according to (10) or (11), wherein the determination unit determines to change the output mode of the content corresponding to the rotation of the wrist of the user in a case where the state of the fingers of the user corresponds to a gesture corresponding to a change of the output of the content.

(13)

The information processing device according to any one of (10) to (12), wherein the determination unit determines to change the output mode of the content corresponding to the rotation of the wrist of the user in a case where the state of the fingers of the user has a shape corresponding to a change of the output of the content.

(14)

The information processing device according to any one of (1) to (13), further comprising: an output unit that outputs the content in the output mode determined by the determination unit.

(15)

An information processing method of executing processing of:

acquiring first information indicating a state of fingers of a user and second information indicating rotation of a wrist of the user; and determining an output mode of content output from a device on a basis of the state of the fingers of the user indicated by the first information and rotation of the wrist of the user indicated by the second information.

(16)

A wristband-type display device worn on a wrist of a user, the display device comprising:

a display unit that is movable along a circumferential direction of the wrist of the user when worn on the wrist of the user; and a holding unit that holds a position of the display unit in a circumferential direction of the wrist of the user at a holding position that is a position before rotation of the wrist of the user when the user rotates the wrist.

(17)

The display device according to (16), wherein the holding unit is a weight movable together with the display unit along the circumferential direction of the wrist of the user when worn on the wrist of the user, and the display unit is held at the holding position with the holding unit held at a position in the circumferential direction of the wrist of the user in a case where the user rotates the wrist about a direction intersecting a gravity direction.

(18)

The display device according to (17), wherein the holding unit is disposed at a position different from a position of the display unit in the circumferential direction of the wrist of the user when worn on the wrist of the user, and the display unit is held at the holding position corresponding to a difference from the holding unit in terms of a position in the circumferential direction of the wrist of the user.

(19)

The display device according to any one of (16) to (18), further comprising:

a band unit that comes into contact with the wrist of the user and rotates in the circumferential direction of the wrist together with the wrist of the user when worn on the wrist of the user.

(20) The display device according to (19), wherein the band unit is disposed between the wrist of the user and the display unit when worn on the wrist of the user.

REFERENCE SIGNS LIST 100, 100A to G INFORMATION PROCESSING DEVICE
11 COMMUNICATION UNIT
12 INPUT UNIT
13 DISPLAY UNIT (OUTPUT UNIT)
14 STORAGE UNIT
15 CONTROL UNIT
151 ACQUISITION UNIT
152 DETECTION UNIT
153 DETERMINATION UNIT
154 GENERATION UNIT
155 TRANSMISSION UNIT
16 SENSOR UNIT
161 FIRST SENSOR
162 SECOND SENSOR
17 SOUND OUTPUT UNIT (OUTPUT UNIT)
20 BAND UNIT
30 WEIGHT (HOLDING UNIT)

The invention claimed is:

1. An information processing device comprising:

circuitry configured to:

acquire first information indicating a state of fingers of a user and second information indicating rotation of a wrist of the user, and send a command to control an output of content based on the first information and the second information, wherein the output includes a display that changes in accordance with an amount of rotation of the wrist, wherein the circuitry is further configured to:

change to one side of one dimension corresponding to the content when the rotation of the wrist of the user is in a first direction, and change to the other side of the one dimension corresponding to the content when the rotation of the wrist of the user is in a second direction opposite to the first direction, when the one dimension corresponding to an output amount of the content, the circuitry is further configured to decrease the output amount of the content depending on the rotation of the wrist of the user in the first direction and determine to increase the output amount of the content depending on the rotation of the wrist of the user in the second direction, and when the one dimension corresponding to a display area of the content, the circuitry is further configured to determine to decrease the display area of the content depending on the rotation of the wrist of the user in the first direction and determine to increase the display area of the content depending on the rotation of the wrist of the user in the second direction.

2. The information processing device according to claim 1, wherein the circuitry is further configured to determine a display mode of the output including the content displayed on a display device based on the state of the fingers of the user and rotation of the wrist of the user.

3. The information processing device according to claim 1, wherein the circuitry is further configured to:

determine whether or not to change an output mode of the content of the output depending on the state of the fingers of the user, and determine an amount of change in the output mode of the content by rotation of the wrist of the user.

4. The information processing device according to claim 3, wherein the circuitry is further configured to determine an amount corresponding to the amount of rotation of the wrist of the user as the amount of change in the output mode of the content.

5. The information processing device according to claim 1, wherein, when the one dimension corresponding to an output volume of the content, the circuitry is further configured to determine to decrease the output volume of the content depending on the rotation of the wrist of the user in the first direction and determines to increase the output volume of the content depending on the rotation of the wrist of the user in the second direction.

6. The information processing device according to claim 1, wherein, when the one dimension corresponding to an up-down direction of the content, the circuitry is further configured to determine to move the display area of the content downward depending on the rotation of the wrist of the user in the first direction and determines to move the display area of the content upward depending on the rotation of the wrist of the user in the second direction.

7. The information processing device according to claim 1, wherein the circuitry is further configured to determine to change an output mode of the content of the output corresponding to the rotation of the wrist of the user when the state of the fingers of the user satisfies a condition.

8. The information processing device according to claim 7, wherein the circuitry is further configured to determine not to change the output mode of the content corresponding to the rotation of the wrist of the user when the state of the fingers of the user does not satisfy the condition.

9. The information processing device according to claim 7, wherein the circuitry is further configured to determine to change the output mode of the content corresponding to the rotation of the wrist of the user when the state of the fingers of the user corresponds to a gesture corresponding to a change of the output of the content.

10. The information processing device according to claim 7, wherein the circuitry is further configured to determine to change the output mode of the content corresponding to the rotation of the wrist of the user when the state of the fingers of the user has a shape corresponding to a change of the output of the content.

11. The information processing device according to claim 1, wherein the circuitry is further configured to:

determine an output mode of the content of the output, and output the content in the determined output mode.

12. A wristband-type display device worn on a wrist of a user, the display device comprising:

a display that is movable along a circumferential direction of the wrist of the user when worn on the wrist of the user; and a weight that holds a position of the display unit in a circumferential direction of the wrist of the user at a holding position that is a position before rotation of the wrist of the user when the user rotates the wrist, wherein the weight is movable together with the display along the circumferential direction of the wrist of the user when worn on the wrist of the user, and the display is held at the holding position with the weight held at a position in the circumferential direction of the wrist of the user when the user rotates the wrist about a direction intersecting a gravity direction.

13. The display device according to claim 12, wherein the weight is disposed at a position different from a position of the display unit in the circumferential direction of the wrist of the user when worn on the wrist of the user, and the display is held at the holding position corresponding to a difference from the holding unit in terms of a position in the circumferential direction of the wrist of the user.

14. The display device according to claim 12, further comprising:

a band that comes into contact with the wrist of the user and rotates in the circumferential direction of the wrist together with the wrist of the user when worn on the wrist of the user.

15. The display device according to claim 14, wherein the band is disposed between the wrist of the user and the display when worn on the wrist of the user.

\* \* \* \* \*